(12) United States Patent
Kumar

(10) Patent No.: US 12,123,803 B2
(45) Date of Patent: Oct. 22, 2024

(54) RAPID COMPRESSION MACHINE WITH ELECTRICAL DRIVE AND METHODS FOR USE THEREOF

(71) Applicant: University of Idaho, Moscow, ID (US)

(72) Inventor: Kamal Kumar, Moscow, ID (US)

(73) Assignee: University of Idaho, Moscow, ID (US)

( * ) Notice: Subject to any disclaimer, the term of this patent is extended or adjusted under 35 U.S.C. 154(b) by 247 days.

(21) Appl. No.: 17/412,834

(22) Filed: Aug. 26, 2021

(65) Prior Publication Data

US 2022/0065752 A1   Mar. 3, 2022

Related U.S. Application Data

(60) Provisional application No. 63/070,935, filed on Aug. 27, 2020.

(51) Int. Cl.
| G01M 15/08 | (2006.01) |
| G01M 15/02 | (2006.01) |
| G01M 15/04 | (2006.01) |
| G01M 15/06 | (2006.01) |

(52) U.S. Cl.
CPC ............ *G01M 15/08* (2013.01); *G01M 15/02* (2013.01); *G01M 15/048* (2013.01); *G01M 15/06* (2013.01)

(58) Field of Classification Search
CPC .... G01M 15/08; G01M 15/02; G01M 15/048; G01M 15/06
USPC .......................................................... 417/321
See application file for complete search history.

(56) References Cited

U.S. PATENT DOCUMENTS

| 1,586,508 | A | * | 5/1926 | Brutzkus | .................... B01J 3/08 |
| | | | | | 204/172 |
| 2,814,551 | A | * | 11/1957 | Broeze | ........................ B01J 3/08 |
| | | | | | 91/170 R |
| 2,814,552 | A | * | 11/1957 | Van Dijck | ............... F02B 71/04 |
| | | | | | 417/349 |
| 3,785,281 | A | * | 1/1974 | Ligh | ..................... B30B 15/068 |
| | | | | | 100/269.18 |

(Continued)

OTHER PUBLICATIONS

Allen et al. "An aerosol rapid compression machine for studying energetic-nanoparticle-enhanced combustion of liquid fuels," *Proceedings of the Combustion Institute* 33(2): 3367-3374, Jan. 2011.

(Continued)

*Primary Examiner* — Kurt Philip Liethen
*Assistant Examiner* — John D Bailey
(74) *Attorney, Agent, or Firm* — Klarquist Sparkman, LLP

(57) ABSTRACT

A rapid compression machine (RCM) employs an electrical drive to move a piston disposed within a chamber housing. The electrical drive converts electrical power into linear motion of the piston, for example, to compress contents in a reaction chamber defined by the chamber housing and the piston. The temperature and pressure changes induced by the compression can cause reaction of contents within the chamber, for example, autoignition of the contents. The RCM can thus be used to study chemical kinetics. In some embodiments, the electrical drive can also rapidly move the piston in reverse to expand a volume of the reaction chamber, for example, to quench the compression-induced reaction therein. In such embodiments, the RCM may be considered a rapid compression-expansion machine (RCEM) and can be used for speciation studies.

15 Claims, 17 Drawing Sheets

(56) References Cited

U.S. PATENT DOCUMENTS

| | | | | | |
|---|---|---|---|---|---|
| 3,807,294 | A * | 4/1974 | Ligh | | B30B 9/3039 |
| | | | | | 100/50 |
| 3,819,330 | A * | 6/1974 | Creighton | | G01N 27/44 |
| | | | | | 422/62 |
| 3,869,241 | A * | 3/1975 | David | | F16K 5/14 |
| | | | | | 425/451.2 |
| 3,961,607 | A * | 6/1976 | Brems | | F02D 15/04 |
| | | | | | 123/51 R |
| 5,579,682 | A * | 12/1996 | Bergman | | B01J 3/042 |
| | | | | | 366/267 |
| 5,725,358 | A * | 3/1998 | Bert | | F04B 13/00 |
| | | | | | 417/415 |
| 6,648,612 | B2 * | 11/2003 | Hsiao | | F04B 39/125 |
| | | | | | 417/313 |
| 7,988,916 | B2 * | 8/2011 | Bremauer | | G01N 31/16 |
| | | | | | 422/50 |
| 8,691,079 | B2 * | 4/2014 | Iaccino | | C10G 69/06 |
| | | | | | 208/106 |
| 8,997,699 | B2 * | 4/2015 | Roelle | | F02B 71/04 |
| | | | | | 123/197.1 |
| 2006/0056985 | A1 * | 3/2006 | Ichikawa | | F04B 39/125 |
| | | | | | 417/269 |
| 2006/0171822 | A1 * | 8/2006 | Seagar | | F04B 35/045 |
| | | | | | 417/258 |
| 2007/0014672 | A1 * | 1/2007 | Genova | | F04B 49/065 |
| | | | | | 417/63 |
| 2007/0201992 | A1 * | 8/2007 | Mernoe | | A61M 5/1454 |
| | | | | | 417/328 |
| 2008/0031747 | A1 * | 2/2008 | Eijkelkamp | | F04B 39/0055 |
| | | | | | 222/333 |
| 2008/0251050 | A1 * | 10/2008 | Jacobsen | | F02B 71/04 |
| | | | | | 123/46 R |
| 2009/0116978 | A1 * | 5/2009 | Valbjoern | | F04B 39/121 |
| | | | | | 92/172 |
| 2010/0014992 | A1 * | 1/2010 | Di Foggia | | F04B 27/02 |
| | | | | | 417/254 |
| 2010/0031696 | A1 * | 2/2010 | Ota | | F04B 39/0253 |
| | | | | | 417/312 |
| 2010/0111719 | A1 * | 5/2010 | Chou | | F04B 35/04 |
| | | | | | 417/313 |
| 2010/0158712 | A1 * | 6/2010 | Hartl | | F04B 27/0404 |
| | | | | | 384/91 |
| 2011/0021990 | A1 * | 1/2011 | Navarro | | F04B 19/006 |
| | | | | | 604/151 |
| 2011/0076164 | A1 * | 3/2011 | Chou | | F04B 53/12 |
| | | | | | 417/550 |
| 2011/0113772 | A1 * | 5/2011 | Rohner | | F01B 17/022 |
| | | | | | 60/509 |
| 2011/0198887 | A1 * | 8/2011 | Rabhi | | F04B 35/002 |
| | | | | | 91/462 |
| 2011/0200462 | A1 * | 8/2011 | Inagaki | | F16C 27/08 |
| | | | | | 417/321 |
| 2012/0031091 | A1 * | 2/2012 | Mungas | | F02G 1/04 |
| | | | | | 60/517 |
| 2012/0047884 | A1 * | 3/2012 | McBride | | F01K 27/00 |
| | | | | | 60/398 |
| 2012/0093665 | A1 * | 4/2012 | Flanigan | | F04B 53/16 |
| | | | | | 417/321 |
| 2012/0095401 | A1 * | 4/2012 | Uchida | | F04B 19/006 |
| | | | | | 604/151 |
| 2012/0141304 | A1 * | 6/2012 | Mayr | | B60T 8/368 |
| | | | | | 269/329 |
| 2012/0189469 | A1 * | 7/2012 | Chou | | F04B 39/12 |
| | | | | | 417/321 |
| 2012/0288911 | A1 * | 11/2012 | Matos | | C12M 33/00 |
| | | | | | 435/174 |
| 2013/0004343 | A1 * | 1/2013 | Cho | | F04B 39/122 |
| | | | | | 417/321 |
| 2013/0034452 | A1 * | 2/2013 | Itahara | | F04B 45/047 |
| | | | | | 417/321 |
| 2013/0115116 | A1 * | 5/2013 | Ki | | F04B 9/00 |
| | | | | | 417/321 |
| 2013/0302181 | A1 * | 11/2013 | Charity, III | | F04B 53/1082 |
| | | | | | 417/416 |
| 2013/0343930 | A1 * | 12/2013 | Ueda | | F04B 35/01 |
| | | | | | 417/321 |
| 2014/0072451 | A1 * | 3/2014 | Schwarz | | F04B 49/20 |
| | | | | | 417/44.1 |
| 2014/0234135 | A1 * | 8/2014 | Chou | | F04B 35/04 |
| | | | | | 417/321 |
| 2014/0248160 | A1 * | 9/2014 | Giessbach | | F04B 27/08 |
| | | | | | 417/53 |
| 2014/0271264 | A1 * | 9/2014 | Florindi | | F04B 17/00 |
| | | | | | 74/409 |
| 2014/0314593 | A1 * | 10/2014 | Lin | | F04B 1/02 |
| | | | | | 417/415 |
| 2014/0322043 | A1 * | 10/2014 | Nagura | | F04B 39/0005 |
| | | | | | 417/321 |
| 2014/0348670 | A1 * | 11/2014 | Lee | | F04B 43/086 |
| | | | | | 417/321 |
| 2014/0377092 | A1 * | 12/2014 | Bruin | | F04B 35/01 |
| | | | | | 417/364 |
| 2015/0093266 | A1 * | 4/2015 | Nelson | | F04D 29/605 |
| | | | | | 417/321 |
| 2016/0090974 | A1 * | 3/2016 | Spindler | | F04B 53/10 |
| | | | | | 417/321 |
| 2016/0097694 | A1 * | 4/2016 | Lysenko | | G01M 15/08 |
| | | | | | 73/40.5 R |
| 2016/0115830 | A1 * | 4/2016 | Stretch | | G01M 15/08 |
| | | | | | 73/114.16 |
| 2016/0146201 | A1 * | 5/2016 | Van Keulen | | F04B 19/22 |
| | | | | | 222/333 |
| 2016/0363511 | A1 * | 12/2016 | Dudeck | | B61L 27/60 |
| 2019/0331553 | A1 * | 10/2019 | Glugla | | F02B 75/04 |
| 2019/0383260 | A1 * | 12/2019 | Frye | | F03B 17/00 |
| 2020/0025127 | A1 * | 1/2020 | Marko | | F02G 1/055 |
| 2020/0353432 | A1 * | 11/2020 | Biesheuvel | | B01J 3/042 |
| 2021/0033528 | A1 * | 2/2021 | Katsu | | G01M 15/05 |

OTHER PUBLICATIONS

Bhari, "A rapid compression machine with the novel concept of crevice containment," PhD diss., University of Akron, 2010.

Donovan et al., "Demonstration of a free-piston rapid compression facility for the study of high temperature combustion phenomena," *Combustion and Flame* 137(3): 351-365, May 2004.

Falk, "The ignition temperatures of hydrogen-oxygen mixtures," *Journal of the American Chemical Society* 28(11): 1517-1534, Nov. 1906.

Kukkadapu et al., "Autoignition of gasoline and its surrogates in a rapid compression machine," *Proceedings of the Combustion Institute* 34(1): 345-352, Jan. 2013.

Mittal et al., "Aerodynamics inside a rapid compression machine," *Combustion and Flame* 145(1-2): 160-180, Apr. 2006.

Mittal et al., "A numerical assessment of the novel concept of crevice containment in a rapid compression machine," *Combustion and Flame* 158(12): 2420-24, Dec. 2011.

Mittal, *A rapid compression machine: design, characterization, and autoignition investigations*. Case Western Reserve University, 2006.

Mittal et al., "A rapid compression machine for chemical kinetics studies at elevated pressures and temperatures," *Combustion Science and Technology* 179(3): 497-530, Mar. 2007.

Mittal et al., "Vortex formation in a rapid compression machine: Influence of physical and operating parameters." *Fuel* 94: 409-417, Apr. 2012.

Neuman, "Development of a rapid compression controlled-expansion machine for chemical ignition studies," PhD diss., Marquette University, 2015.

Park et al., "Rapid compression machine measurements of ignition delays for primary reference fuels," *SAE Transactions* 11-23, Jan. 1990.

Pitz et al., "Recent progress in the development of diesel surrogate fuels," *Progress in Energy and Combustion Science* 37(3): 330-350, Jun. 2011.

Sung et al., "Using rapid compression machines for chemical kinetics studies," *Progress in Energy and Combustion Science* 44: 1-18, Oct. 2014.

(56) References Cited

OTHER PUBLICATIONS

Werler et al., "A Rapid Compression Expansion Machine (RCEM) for studying chemical kinetics: Experimental principle and first applications," *arXiv preprint arXiv: 1606.06095*, Jun. 2016.

Würmel et al., "CFD studies of a twin-piston rapid compression machine." *Combustion and Flame* 141(4): 417-430, 2005.

Tripathi et al., "Investigating trajectory-based combustion control using a controlled trajectory rapid compression and expansion machine." *ASME Letters in Dynamic Systems and Control* 1(3): 031007, Jul. 2021.

Werler et al., "A rapid compression expansion machine (RCEM) for studying chemical kinetics: experimental principle and first applications." *arXiv Preprint arXiv:1606.06095*, 2016.

\* cited by examiner

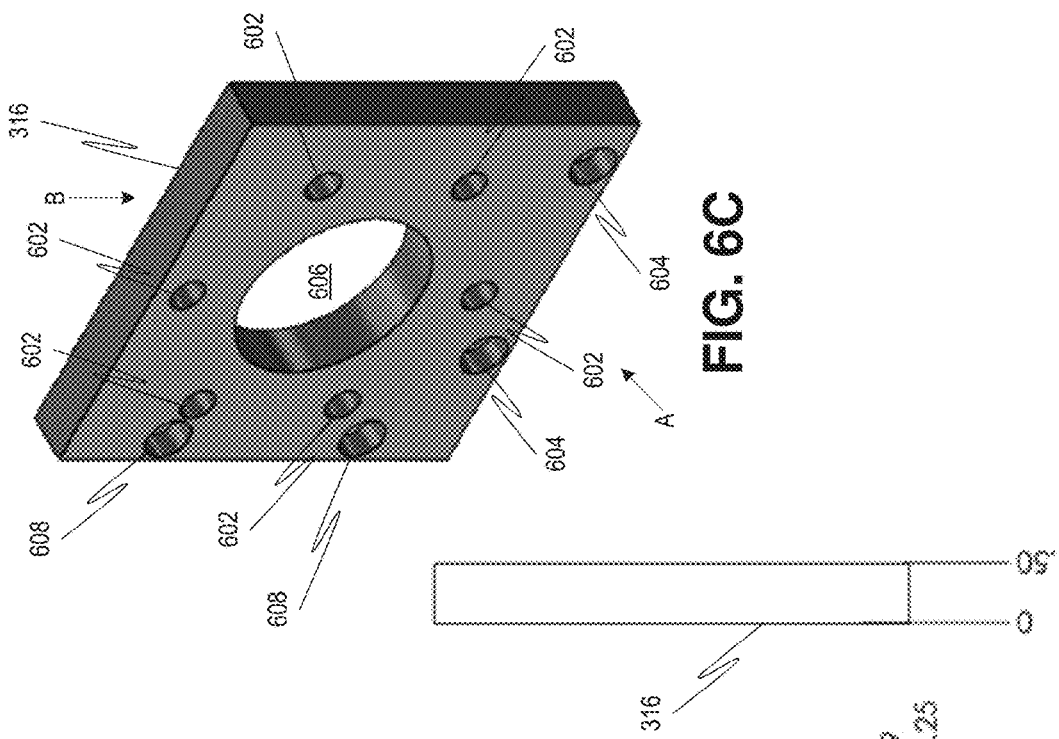
FIG. 6C
FIG. 6B
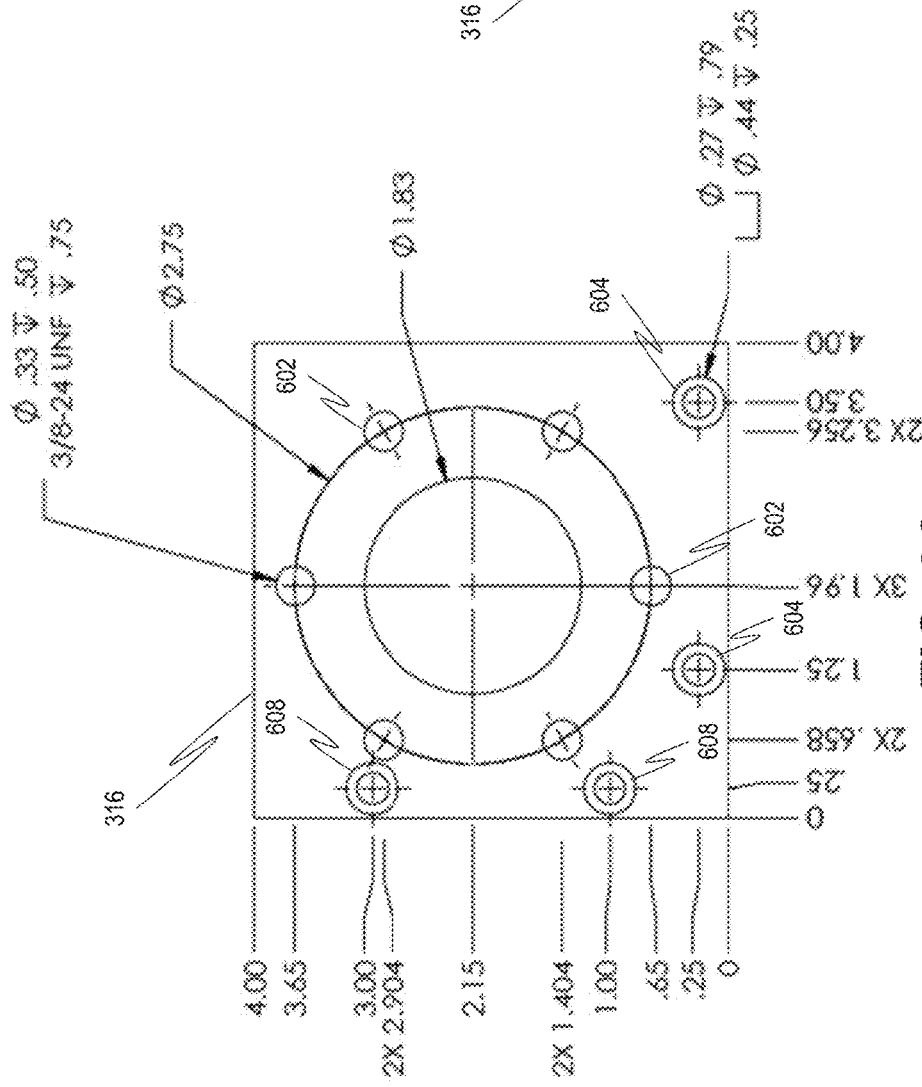
FIG. 6A

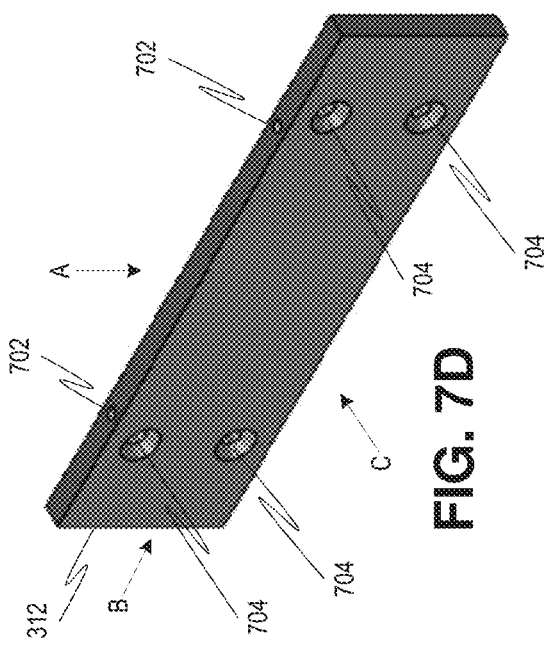
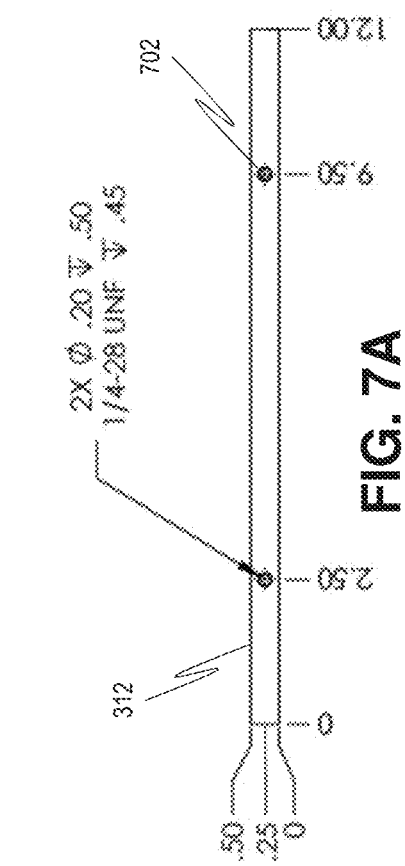
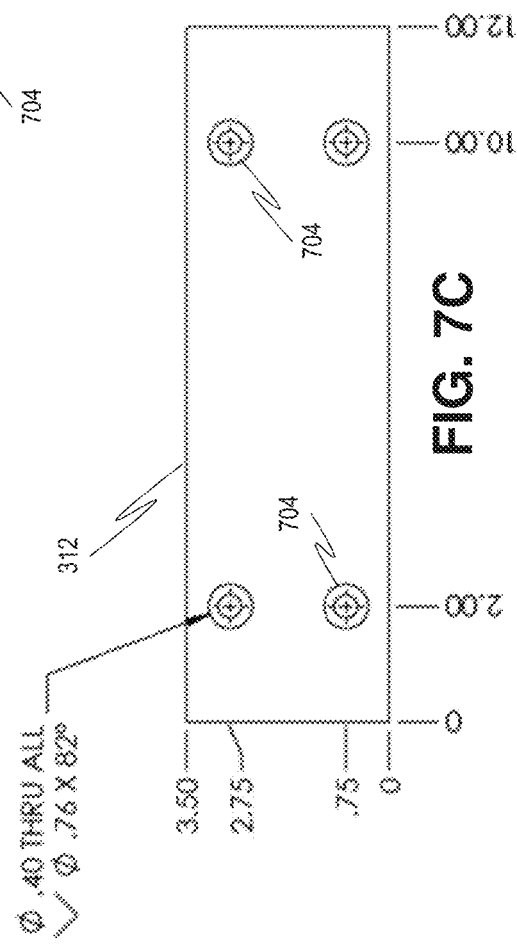
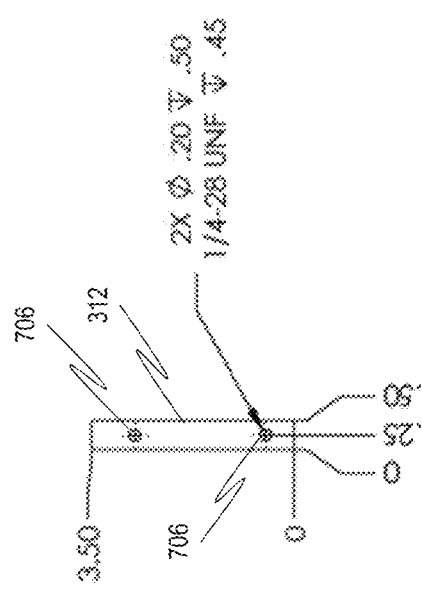
FIG. 7A
FIG. 7B
FIG. 7C
FIG. 7D

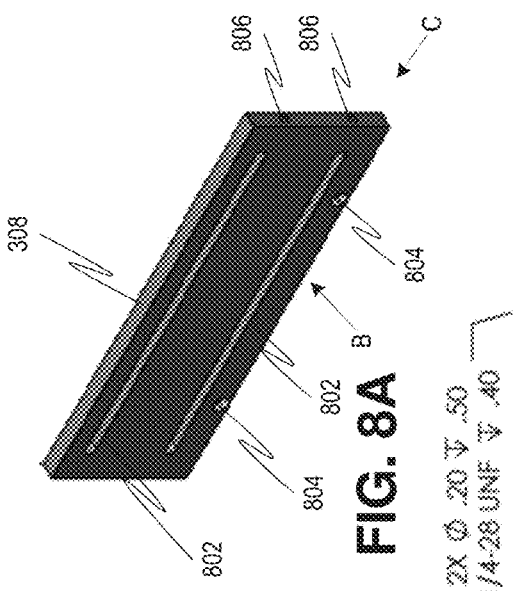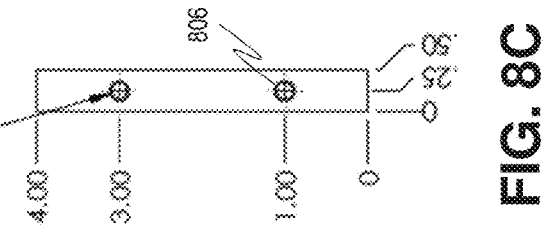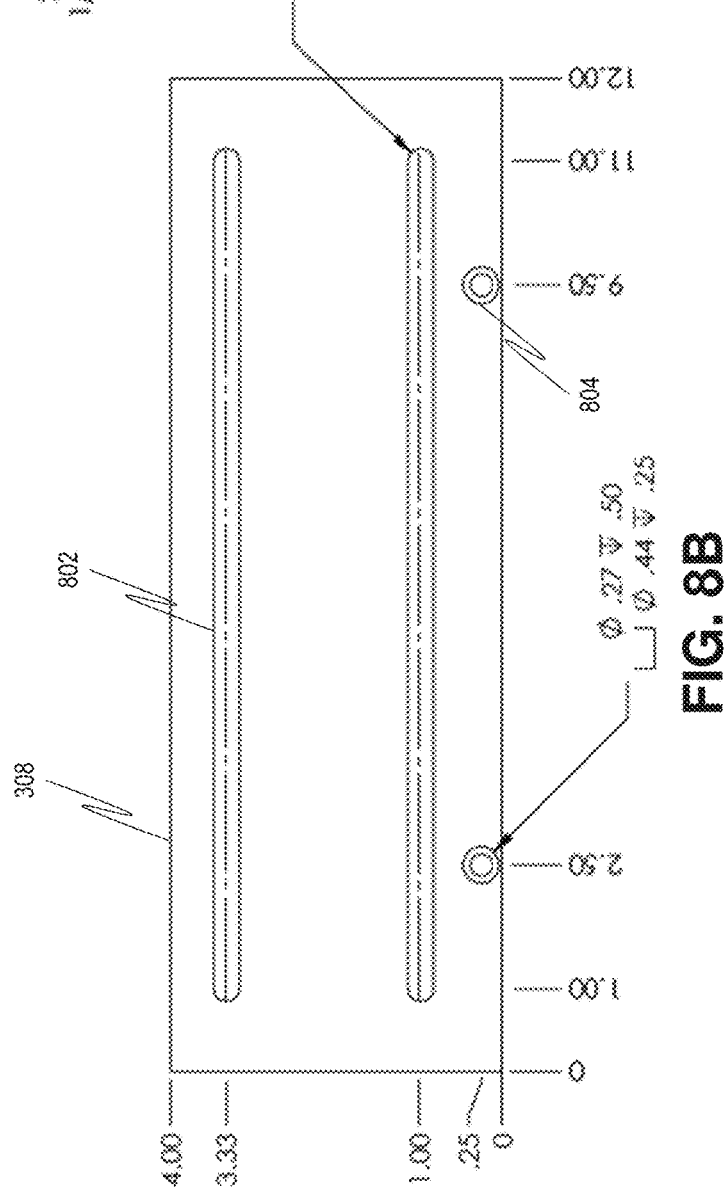

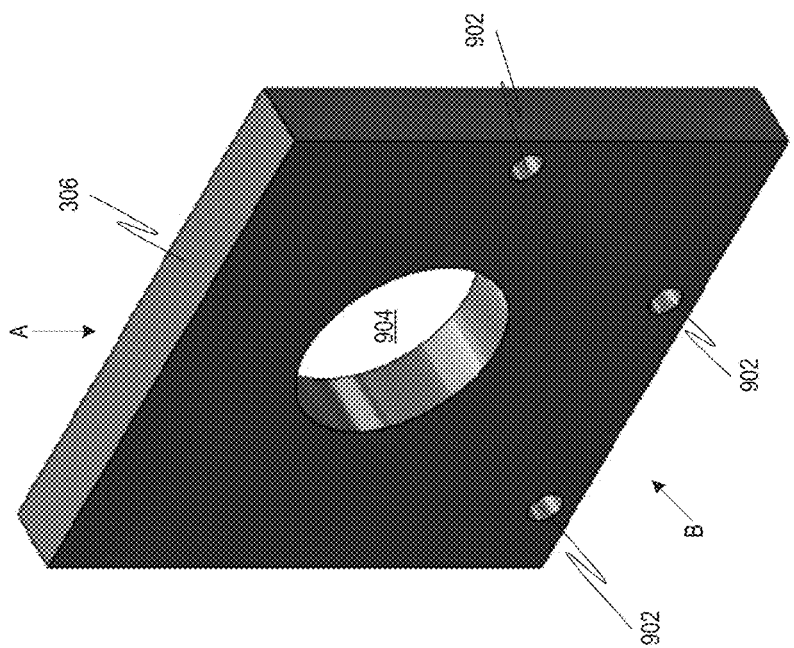
FIG. 9C
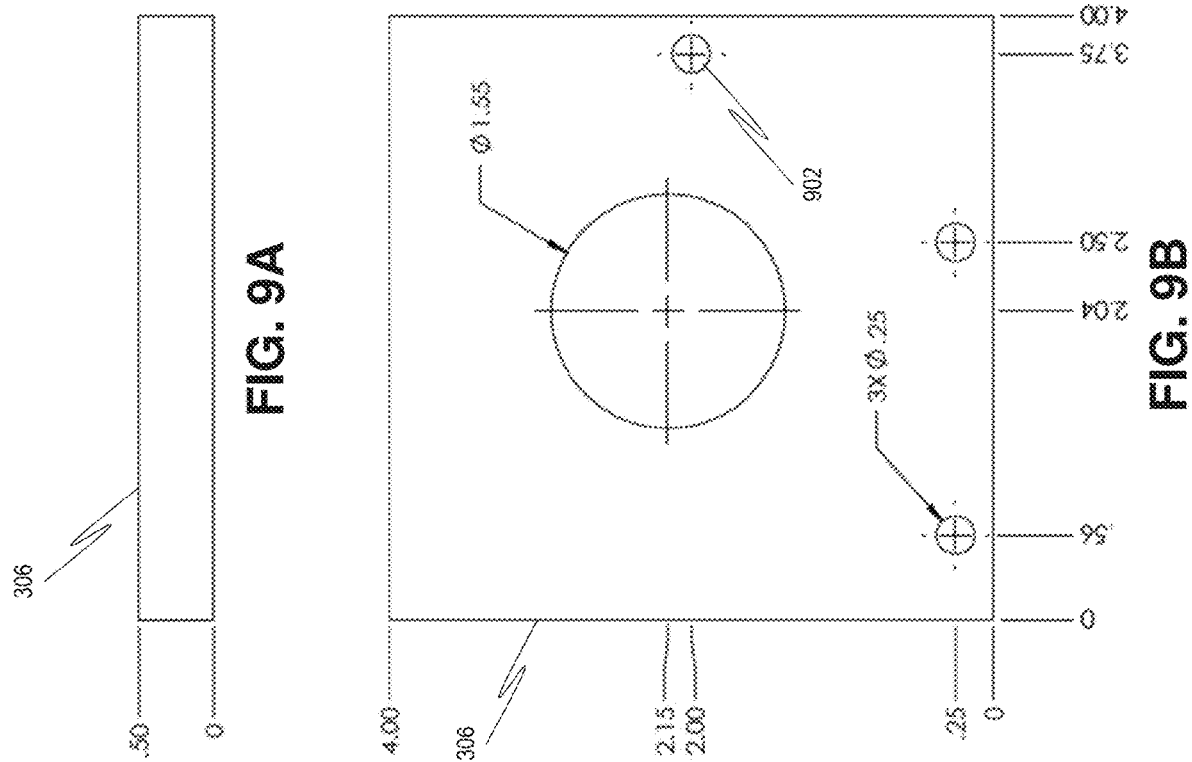
FIG. 9A
FIG. 9B

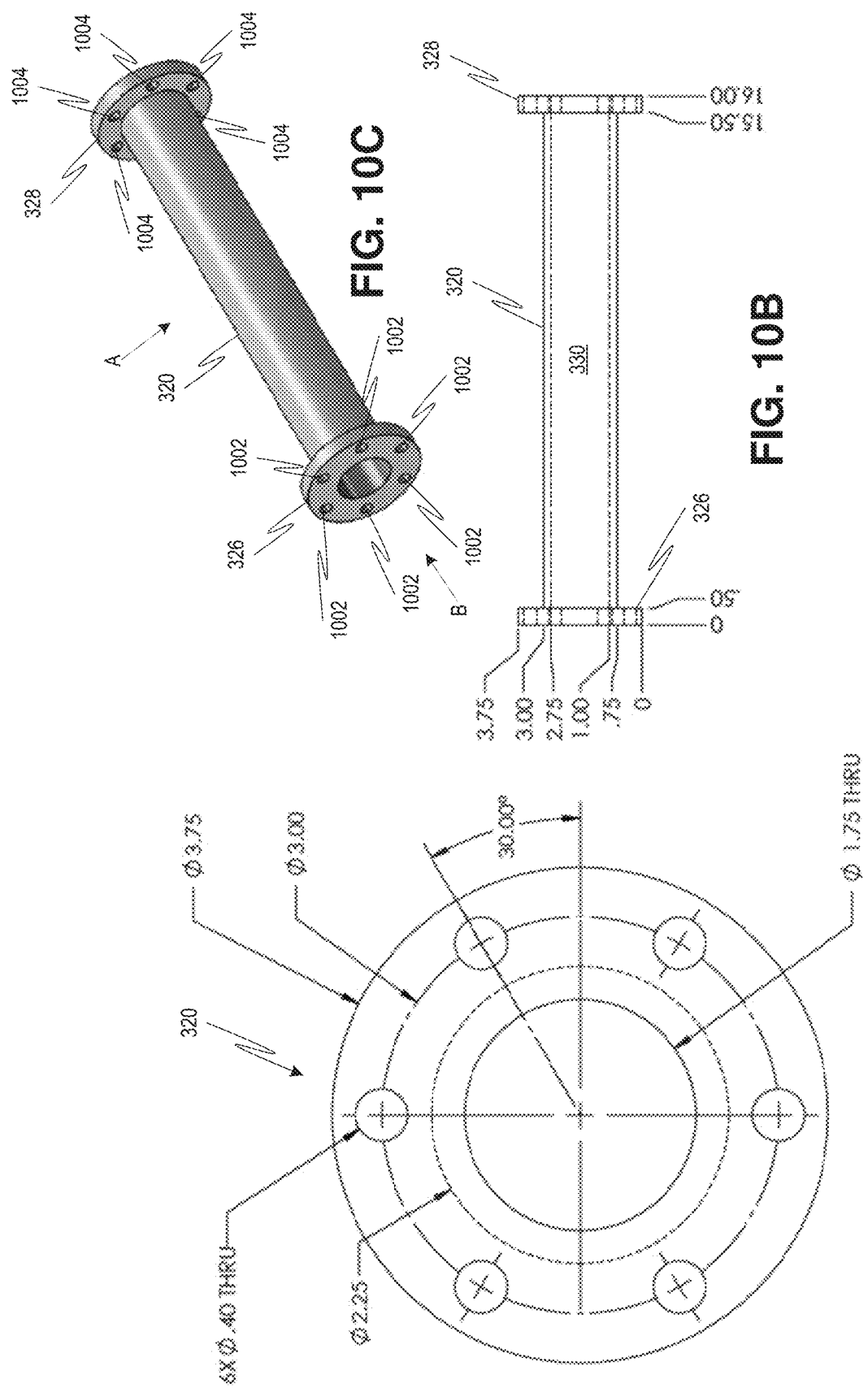

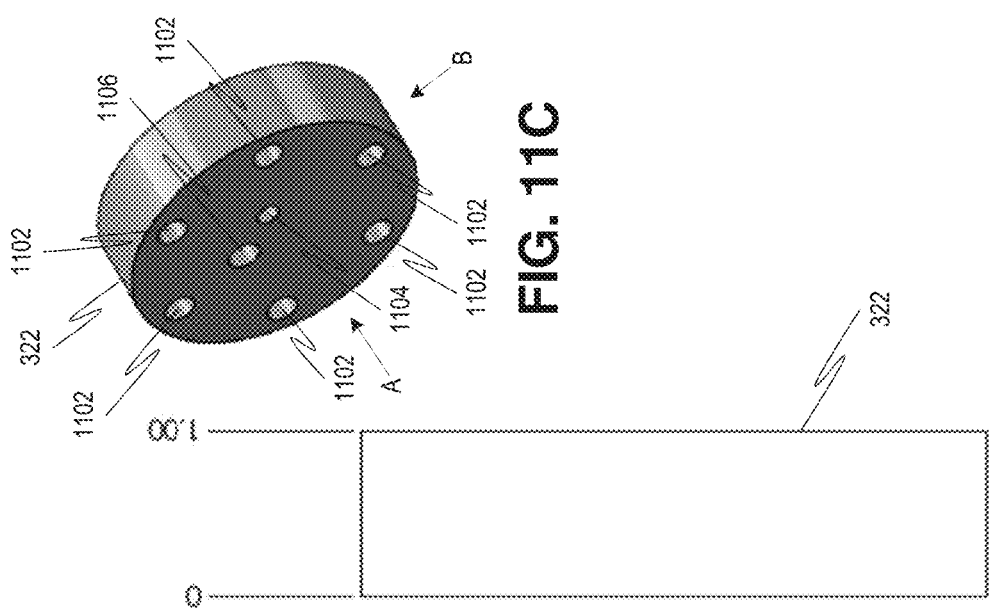
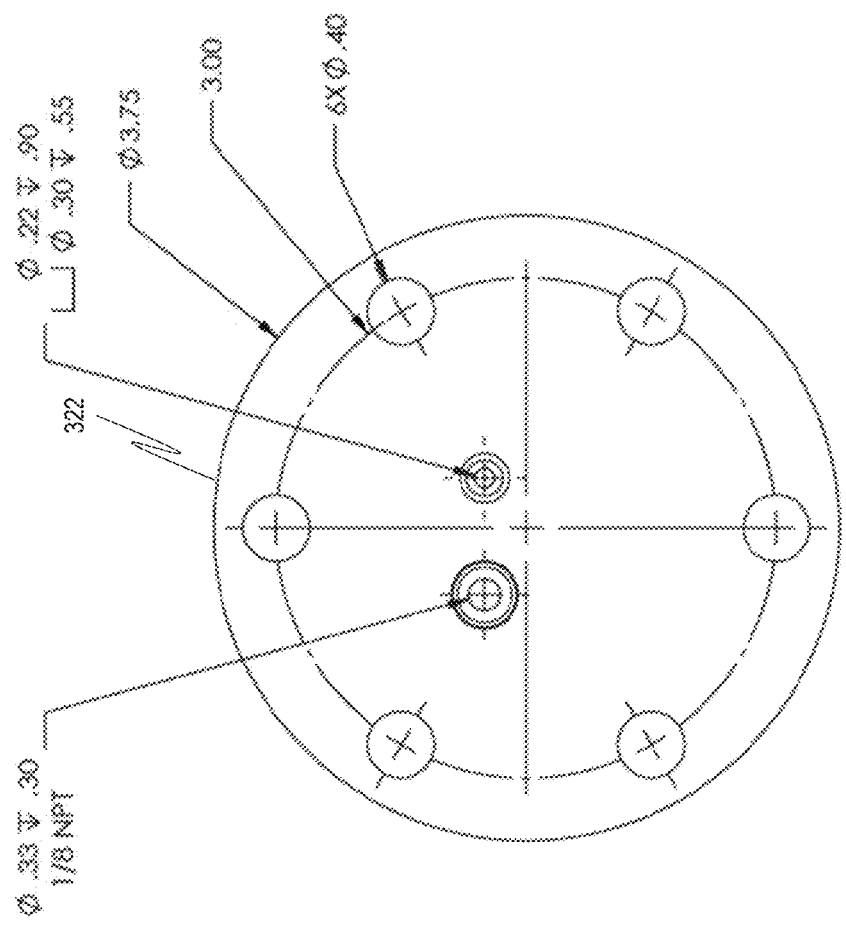
FIG. 11C
FIG. 11B
FIG. 11A

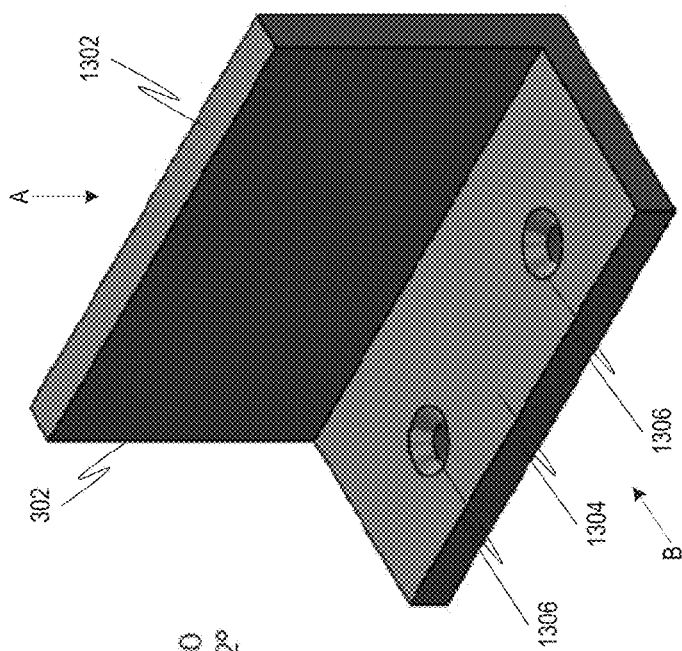
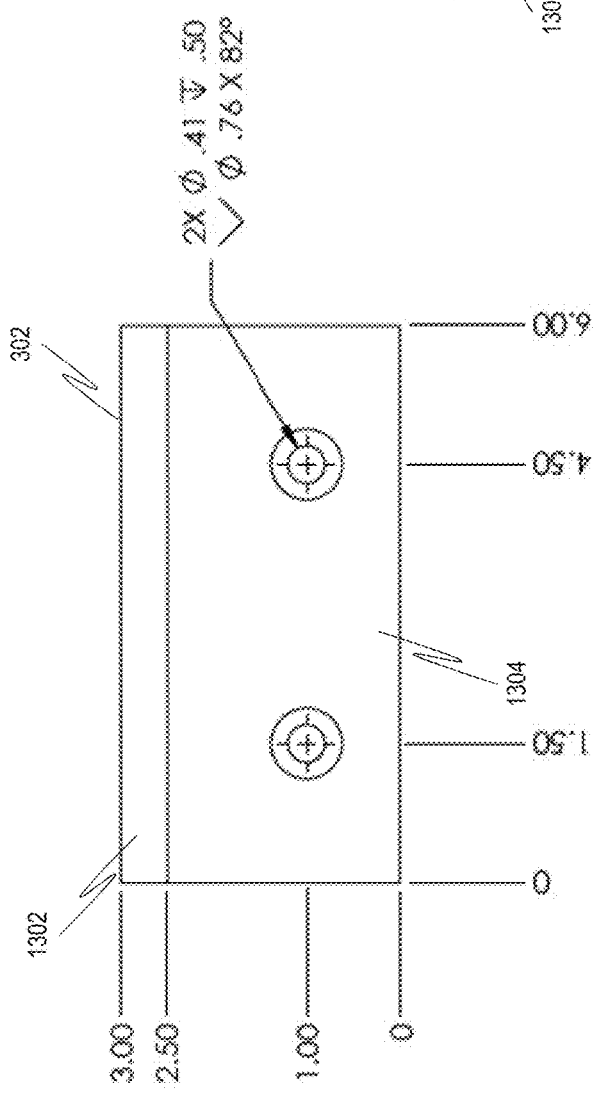
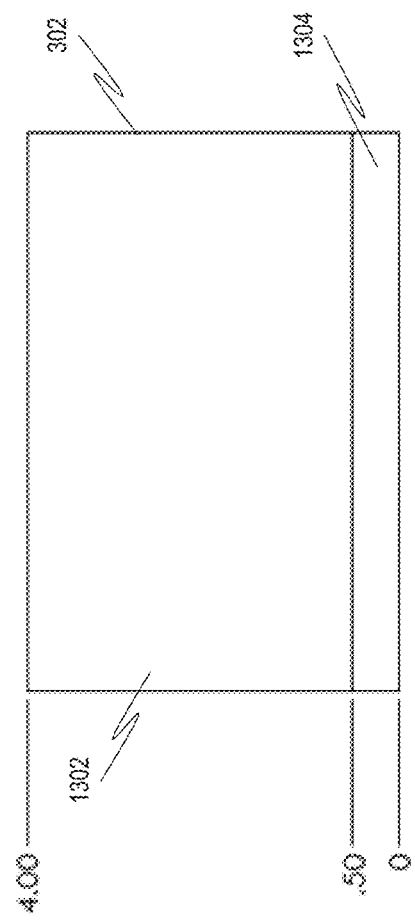
FIG. 13C
FIG. 13A
FIG. 13B

RAPID COMPRESSION MACHINE WITH ELECTRICAL DRIVE AND METHODS FOR USE THEREOF

CROSS REFERENCE TO RELATED APPLICATION

This application claims the benefit of U.S. Provisional Application No. 63/070,935, filed Aug. 27, 2020, which is incorporated herein by reference in its entirety.

FIELD

The present disclosure relates generally to systems and methods for performing chemical studies, and more particularly, to rapid compression machines and methods for use thereof.

BACKGROUND

Rapid compression machines (RCMs) have been used to study chemical kinetics. RCMs can simulate a single compression stroke of an internal combustion (IC) engine. However, unlike an IC engine, RCMs are designed to minimize fluid dynamic effects of in-cylinder charge motion in order to provide an aerodynamically-clean environment where chemical kinetics can be studied, in particular, fuel-combustion kinetics. For example, RCMs have been used to study the chemistries and autoignition behaviors of alkanes, cycloalkanes, aromatics, alcohols, gasoline, diesel fuel, and jet-fuel, among other substances.

In conventional RCMs, a piston is driven by mechanical means (e.g., hydraulic or pneumatic actuators) to compress a fixed mass of a premixed fuel-air mixture. For example, in some conventional RCMs, a pneumatic driving force initiates and sustains piston motion, while hydraulic damping is used to rapidly decelerate and stop the piston at the end of compression. Typically, the compression duration in a conventional RCM is about 30-100 milliseconds (ms), after which the position of the piston is held fixed for "post compression" phase. For example, in some conventional RCMs, the piston is held by the force of driving air in a pneumatic cylinder, where the pneumatic force is selected to be greater than the force of the compressed substance in the reaction chamber. In this post-compression phase, the conditions within the RCM can be taken to represent a constant volume reactor with elevated temperature and pressure conditions. In conventional RCMs, post-compression pressures and temperatures within the reaction chamber are typically about 7-50 bar and 600-1100 K, respectively, and these post-compression conditions typically can be maintained for about 30-50 ms.

However, the use of mechanical means for controlling motion of the piston in conventional RCMs may unnecessarily compromise testing data and/or testing throughput. For example, the use of mechanical means to arrest piston motion can cause vibrations of the machine, which can lead to significant noise in the experimental data. Moreover, the mechanical actuation can make it difficult to unambiguously identify both the start and end of compression. This difficulty has required the adoption of arbitrary reference points to identify the start and end of compression. But the reference points can vary between machines and/or users, and thus undermine repeatability. Conventional RCMs also lack precise control over piston motion (position, velocity, and acceleration) or measurements thereof, thereby making it difficult to directly determine the volume profile of the reaction chamber. Yet chemical reaction modeling or simulations often require a precise time history of the reaction chamber volume.

In addition, with conventional RCMs, the tracking of intermediates during a pre-ignition phase as a function of time (e.g., speciation data) can be challenging due to the rapidity and explosive nature of the reaction. In conventional RCMs, a diaphragm-rupturing technique is often employed to immediately release the high pressure generated by the compression and thereby quench the reaction within the reaction chamber at a specific time during the pre-ignition phase. However, the diaphragm-rupturing technique generally lacks repeatability, especially since the end of compression can be difficult to determine in conventional RCMs. The diaphragm-rupturing technique is also tedious as it requires disassembling the reaction chamber of the RCM to install a new diaphragm after each rupture.

Embodiments of the disclosed subject matter may address one or more of the above-noted problems and disadvantages, among other things.

SUMMARY

Embodiments of the disclosed subject matter provide a rapid compression machine (RCM) that employs an electrical drive to move a piston in order to change a volume of the reaction chamber, and methods for operation thereof. For example, the electrical drive can move the piston to compress contents in the reaction chamber. The electrical drive can then rapidly stop the piston and hold it in position to yield a predetermined final compressed volume of the reaction chamber (and thus a desired compression ratio). Increases in temperature and pressure induced by the compression can cause reaction of contents within the chamber, for example, autoignition of the contents. In some embodiments, the position of the piston can be monitored, for example, by sensing integrated with the electrical drive, such that compression start and end points can be readily identified and/or reaction chamber volume quantified. In some embodiments, the electrical drive can also provide reverse motion of the piston, for example, to rapidly expand the volume of the reaction chamber in order to quench the compression-induced reaction therein. In such embodiments, the RCM may be considered a rapid compression-expansion machine (RCEM).

In a representative embodiment, a system can comprises a chamber housing, a piston, and an electrical drive. The piston can be disposed within the chamber housing. The electrical drive can be coupled to the piston and constructed to convert electrical power into linear motion of the piston within the chamber housing. The chamber housing and the piston can together define a reaction chamber. Linear motion of the piston within the chamber housing can change a volume of the reaction chamber. In some embodiments, the system is configured as a rapid compression machine or a rapid compression-expansion machine.

In another representative embodiment, a method can comprise advancing a piston into a chamber housing using an electrical drive. The chamber housing and the piston can together define a reaction chamber. The advancing can reduce a volume of the reaction chamber, thereby increasing pressure and temperature in the reaction chamber. The method can further comprise, after the advancing, using the electrical drive to maintain a position of the piston within the chamber housing. In some embodiments, the chamber housing, piston, and electrical drive can be configured as a rapid compression machine or a rapid compression-expansion machine, and the advancing can compress a test mixture within the reaction chamber to study or analyze a reaction of the test mixture.

This summary is not intended to identify key features or essential features of the claimed subject matter, nor is it intended to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Any dimensions indicated in the drawings are intended as exemplary values only, and other dimensions are also possible. Throughout the figures, like reference numerals denote like elements.

FIGS. 6A-6B are orthogonal, dimensioned side views of an exemplary threaded front plate 316 employed in the rapid compression machine of FIG. 3A.

FIG. 6C is a three-dimensional isometric view of the threaded front plate of FIGS. 6A-6B.

FIGS. 7A-7C are orthogonal, dimensioned side views of an exemplary base plate 312 employed in the rapid compression machine of FIG. 3A.

FIG. 7D is a three-dimensional isometric view of the base plate of FIGS. 7A-7C.

FIG. 8A is a three-dimensional isometric view of an exemplary side plate 308 employed in the rapid compression machine of FIG. 3A.

FIGS. 8B-8C are orthogonal, dimensioned side views of the side plate of FIG. 8A.

FIGS. 9A-9B are orthogonal, dimensioned side views of an exemplary back plate 306 employed in the rapid compression machine of FIG. 3A.

FIG. 9C is a three-dimensional isometric view of the back plate of FIGS. 9A-9B.

FIGS. 10A-10B are dimensioned end and cross-sectional views, respectively, of an exemplary cylinder 320 employed in the rapid compression machine of FIG. 3A.

FIG. 10C is a three-dimensional isometric view of the cylinder of FIGS. 10A-10B.

FIGS. 11A-11B are orthogonal, dimensioned side views of an exemplary cylinder head 322 employed in the rapid compression machine of FIG. 3A.

FIG. 11C is a three-dimensional isometric view of the cylinder head of FIGS. 11A-11B.

FIGS. 13A-13B are orthogonal, dimensioned side views of an exemplary L-channel hard stop 302 employed in the rapid compression machine of FIG. 3A.

FIG. 13C is a three-dimensional isometric view of the L-channel hard stop of FIGS. 13A-13B.

DETAILED DESCRIPTION

Overview of Terms

Figure 1:
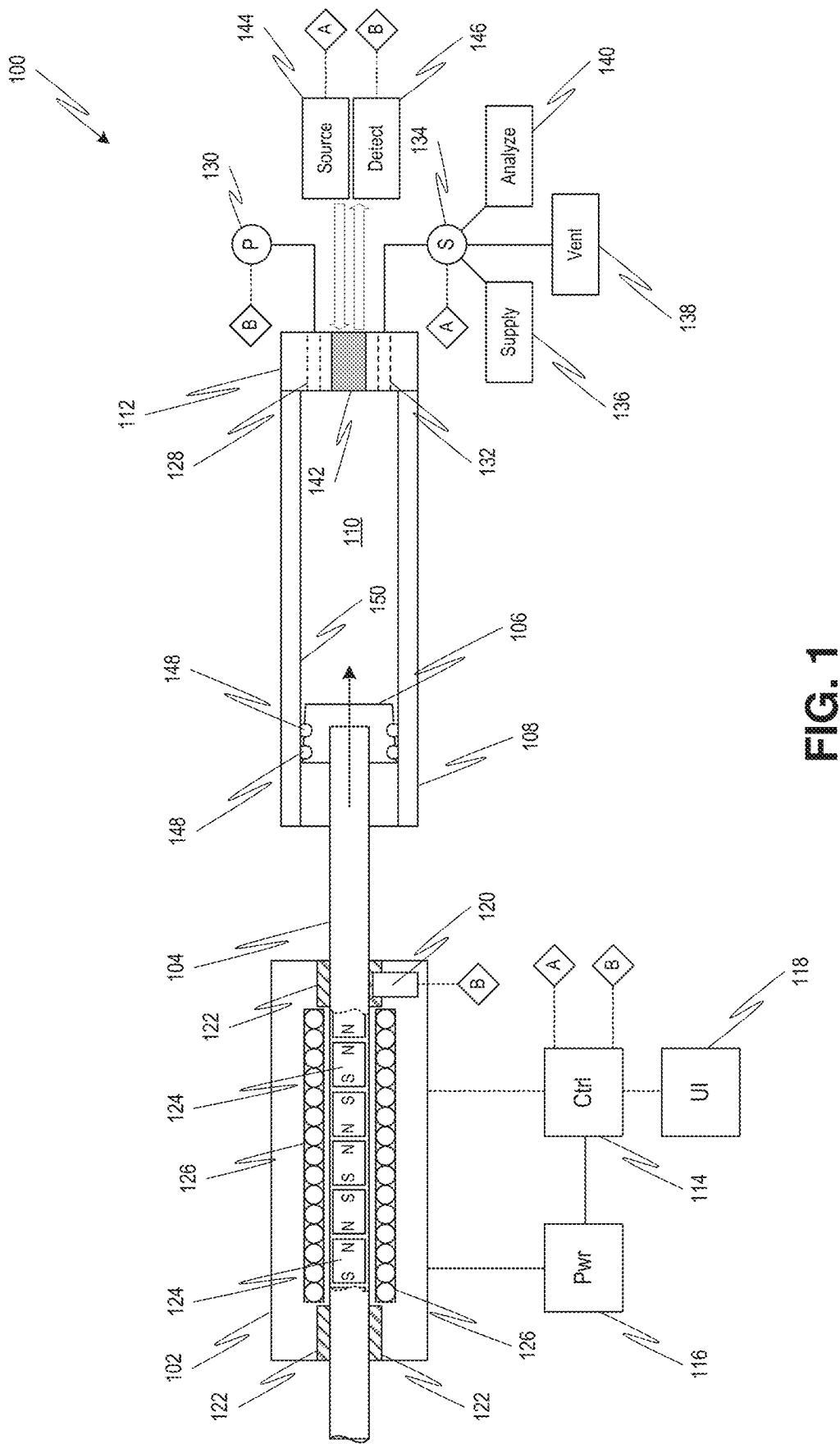
FIG. 1 is a simplified schematic view illustrating aspects of an exemplary rapid compression machine with electrical drive, according to one or more embodiments of the disclosed subject matter.

The following explanations of specific terms and abbreviations are provided to facilitate the description of various aspects of the disclosed subject matter and to guide those of ordinary skill in the art in the practice of the disclosed subject matter.

As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Rapid Compression Machine (RCM): A machine capable of moving a piston to rapidly compress (e.g., within 100 ms or less) a volume of a reaction chamber to subject contents therein to an elevated pressure (e.g., at least 2 bar, and preferably greater than 5 bar) and elevated temperature (e.g., at least 600 K), and maintains the compressed volume for a period of time (e.g., at least 100 ms after the final piston position has been reached).

Rapid Compression-Expansion Machine (RCEM): An RCM that is also capable of retracting the piston to rapidly expand (e.g., within 100 ms or less) the volume of the reaction chamber to release pressure on contents therein, for example, to quench a compression-induced reaction of the contents.

Optical Radiation or Light: Electromagnetic radiation having wavelength(s) within the near-ultraviolet (UV) (300-400 nm), visible (400-740 nm), and/or near-infrared (IR) (740-1400 nm) regimes.

Electrical Drive: An actuator that converts electrical energy into mechanical motion. Examples include, but are not limited to, a linear motor, rail gun, and electromechanical actuator (e.g., a rotary electric motor coupled to a screw, wheel, cam system, or other coupling mechanism(s) that converts the rotary motion of the motor into linear motion).

Linear Motor: A specific type of electrical drive that uses the interaction between a magnetic field generated by stator windings to move a member that has one or more magnets (e.g., permanent magnets) therein.

INTRODUCTION

Embodiments of the disclosed subject matter provide rapid compression machines (RCMs) that employ electrical drives, and methods for use thereof. Each RCM can have a reaction chamber defined by a chamber housing and a piston. The piston can move within the chamber housing to change a volume of the reaction chamber. The electrical drive can convert electrical power into linear motion of the piston, for example, to rapidly (e.g., within 100 ms or less) compress contents in the reaction chamber. The electrical drive can then rapidly stop the piston (e.g., end of compression (EOC)) and hold it in position (e.g., a post-compression phase) to yield a predetermined final compressed volume of the reaction chamber (and thus a desired compression ratio). The pressure induced by the compression (and accompanying temperature elevation) can cause contents within the reaction chamber to undergo a reaction, for example, autoignition of the contents. The RCM can thus be used to study chemical kinetics. For example, the disclosed RCM can be used to study general reaction kinetics in premixed gases, aerosols/dusty mixture, and spray environments, or for any other chemical study in which RCMs are conventionally employed.

One or more sensors can be provided to monitor the conditions within the reaction chamber. For example, in some embodiments, the RCM includes a pressure transducer that detects pressure within the reaction chamber. The state at EOC is related to the initial state through the equation $$\int_{T_0}^{T_C} \frac{\gamma}{\gamma-1} \frac{dT}{T} = \ln\left(\frac{P_C}{P_0}\right),$$

where $\gamma$ is the specific heat ratio and is a function of temperature, $T_0$ is the experimentally-measured initial temperature, $P_0$ is the experimentally-measured initial pressure within the RCM (e.g., at the start of compression, SOC), $P_C$ is the experimentally-measured compressed charge pressure within the RCM, and $T_C$ is the compressed temperature that can be deduced from the equation. For a given $P_C$, autoignition delay times can be determined for fuel-air mixtures compressed by the RCM as a function of the compressed temperature, $T_C$.

The electrical drive allows for precise, accurate, and programmable control of the motion of the piston, and thus improved control of the reaction chamber conditions as compared to mechanical actuation. For example, the electrical drive can allow a user to program a velocity profile for motion of the piston with a predetermined acceleration and/or deceleration. Moreover, the final volume of the reaction chamber (e.g., after EOC and during the post-compression phase) is defined by motion of the electrical drive rather than a mechanical stop. Accordingly, the RCM with electrical drive avoids vibrations generated by impact between the piston and the mechanical stop, as well as the associated noise issues that could compromise data integrity. The lack of a mechanical stop in the disclosed RCM also allows a large number of different compression ratios to be easily accommodated (e.g., by simply programming the electrical drive for a different piston stop position at EOC) without otherwise altering the physical construction of the machine.

In some embodiments, the position of the piston can be monitored such that SOC and EOC can be readily identified, and/or reaction chamber volume can be easily quantified. Alternatively or additionally, in some embodiments, the electrical drive can provide one or more output signals (e.g., based on piston position or reaction chamber volume) that can be used, for example, to synchronize operation of other system components, such as detectors (e.g., camera or optical sensor), interrogation devices (e.g., laser that illuminates the contents in the reaction chamber), or processing devices (e.g., valve that allows access to the reaction chamber for removing contents therein). In some embodiments, for example, the electrical drive can provide a digital synchronization signal based on SOC, EOC, or any other parameter.

In some embodiments, the electrical drive can also provide reverse motion of the piston, for example, to rapidly (e.g., within 100 ms or less) expand the volume of the reaction chamber in a controlled manner (e.g., at a desired time after EOC and/or with a desired retraction velocity for the piston). In some embodiments, the rapid expansion of the reaction chamber volume can be effective to quench a compression-induced reaction therein. In such embodiments, the RCM may be considered a rapid compression-expansion machine (RCEM). The ability to quench reactions without requiring replacement of a consumable part can allow the RCEM to perform multiple sequential tests without otherwise requiring disassembly or replacement of parts of the RCEM. Since EOC is readily determined and the RCEM is capable of rapid expansion, the duration of the reaction prior to quenching can be precisely controlled and varied between experiments to more easily obtain speciation data.

System Embodiments

FIG. 1 illustrates an exemplary RCM 100 according to one or more embodiments of the disclosed subject matter. The RCM 100 has an electrical drive 102, a thrust rod 104, a piston 106, and chamber housing 108. The chamber housing 108 has an internal conduit, with one end of the conduit closed by a chamber end plate 112 and the other end of the conduit open to the piston 106. The piston 106 is disposed within an internal conduit of the chamber housing 108 and movable therein to change a volume of a reaction chamber 110. The reaction chamber 110 is thus defined by a leading end of piston 106, interior sidewall(s) 150 of the chamber housing 108, and an end face of chamber end plate 112.

In the illustrated example, the chamber end plate 112 includes multiple ports 128, 132. Alternatively, in some embodiments, one or more of ports 128, 132 can be provided in chamber housing 108 instead of or in addition to chamber end plate 112. In the illustrated example, port 128 is coupled to a pressure transducer 130 that senses a pressure within the reaction chamber 110. Alternatively, pressure transducer 130 can be disposed within port 128. Port 132 is coupled to a valve 134. In the illustrated example, valve 134 (e.g., an automated or manual multi-position valve) switches access to reaction chamber between a supply 136 (e.g., a container with a prepared fuel-air mixture to be delivered to the reaction chamber 110 via port 132), an exhaust 138 (e.g., a vent or exhaust hood for disposing of reacted products extracted from reaction chamber 110 via port 132), and/or an analyzer 140 (e.g., for analysis of reacted products extracted from reaction chamber via port 132). Alternatively, valve 134 can be a simple on-off valve and/or a user of the RCM can connect a particular inlet/outlet (e.g., supply, exhaust, and/or analyzer) to the valve 134 when use thereof is desired. In some embodiments, for example, the analyzer 140 can be a gas chromatography (GC) system, a mass spectrometry (MS) system, a Fourier Transform infrared (FTIR) spectroscopy system, a non-dispersive infrared (NDIR) spectroscopy system, or any combination thereof. Preferably, the analyzer 140 is a GC-MS system, which allows simultaneously separation and identification of the gaseous components in the reacted products from the reaction chamber.

In the illustrated example, the chamber end plate 112 also includes a window 142 that allows radiation to pass between the reaction chamber 110 and devices external thereto, thereby allowing visual monitoring and/or interrogation of the contents within the reaction chamber 110. For example, the window 142 can be formed of a material that is substantially-transparent to optical radiation, such as quartz. Other materials for window 142 are also possible, depending on the wavelengths to which the window should be substantially transparent. For example, when transparency to wavelengths in the infrared range (e.g., 700 nm-1 mm) is desired, the window may be formed of sapphire (aluminum oxide), zinc selenide, calcium fluoride, magnesium fluoride, germanium, or silicon. For example, when transparency to wavelengths in the ultra-violet (UV) range (e.g., 10 nm-400 nm) is desired, the window may be formed of UV grade fused silica. In the illustrated example, light source 144 (e.g., laser, laser diode, light-emitting diode, etc.) directs interrogating optical radiation into the reaction chamber 110 via window 142, and detector 146 (e.g., an imaging device with a 2-D array of pixels, a spectrometer, an intensity sensor responsive to wavelengths in the IR, visible, and/or UV regimes, or any other light detecting device) receives optical radiation from the reaction chamber 110 via window 142.

Alternatively, in some embodiments, the light source 144 and detector 146 can be provided with separate transparent windows rather than both using a single window 142. Alternatively, in some embodiments, window 142, light source 144, and/or detector 146 can be omitted altogether, for example, when an experiment does not require visual monitoring or optical interrogation. Alternatively, in some embodiments, the entire chamber end plate 112 can be formed of a substantially-transparent material instead of providing window 142 therein. Alternatively, in some embodiments, window 142 within chamber end plate 112 can be omitted in favor of another substantially-transparent member, such as a substantially-transparent annular member disposed between the end plate 112 and chamber housing 108. In such a configuration, the source 144 and detector 146 can be reoriented to send/receive radiation through the annular member instead of through the end plate 112.

The piston 106 is coupled to an end of the thrust rod 104, which extends to electrical drive 102. Movement of the thrust rod 104 by the electrical drive 102 thus causes motion of the piston 106 within the chamber housing 108. For example, the electrical drive 102 is configured as a linear actuator or motor. In the illustrated example, the thrust rod 104 includes one or more magnets 124 (e.g., permanent magnets) therein and is movably supported by bearings 122 of the electrical drive 102. Application of electrical power to stator windings 126 of the electrical drive 102 generates a magnetic field that interacts with the magnetic field of thrust rod magnets 124 to drive the thrust rod toward or away from the chamber housing 108 in a substantially linear motion. In the illustrated embodiment, the electrical drive 102 includes a position sensor 120 (e.g., an encoder) that detects position and/or movement of the thrust rod 104 and thereby position and/or movement of the piston 106. Alternatively or additionally, position sensor 120 can be separate from electrical drive 102.

Other electrical-based actuators are also possible for electrical drive 102 according to one or more contemplated examples. For example, electrical drive 102 can instead be configured as a rail gun or an electromechanical actuator (e.g., a rotary electric motor coupled to a screw, wheel, cam system, or other coupling mechanism(s) that converts the rotary motion of the motor into linear motion). Preferably, the electrical-based actuator employed for the electrical drive 102 is capable of achieving rapid compression of the reaction chamber 110. For example, electrical drive 102 is constructed to move piston 106 (e.g., via thrust rod 104) over at least part of its trajectory within the chamber housing 108 at a velocity of about 5 m/s or greater, and/or an acceleration of about 150 m/s$^2$ or greater.

In the illustrated example, the piston 106 includes one or more sealing members 148. The sealing member(s) 148 are constructed to interact with the sidewall(s) 150 of the internal conduit of the chamber housing 108 to create a seal that prevents contents within the reaction chamber from escaping via a flowpath around the piston 106. For example, each sealing member 148 can be any type of piston seal, such as an O-ring loaded lip seal. In some embodiments, for example, each sealing member 148 is a loaded graphite seal.

A control system 114 is operatively coupled to the electrical drive 102 and is configured to control operation of the RCM 100. In the illustrated example, the control system 114 is operatively coupled to power supply 116 (e.g., an alternating current (AC) supply, an AC to direct current (DC) power converting device, and/or a power storage device (e.g., a battery)). Power supply 116 can also be used to power other components of the RCM 100, for example, pressure transducer 130, valve 134, light source 144, and/or detector 146. Although a single power supply 116 is illustrated, it is also possible for multiple power supplies to be provided, for example, a separate power supply for each powered component.

The control system 114 is configured to control electrical power supplied to the electrical drive 102 (e.g., stator windings 126) to effect positioning of the piston 106 via linear motion of thrust rod 104. The control system 114 is also operatively coupled to send command or trigger signals (A) to source 144 and valve 134 in addition to the electrical drive 102. The control system 114 is also operatively coupled to receive data signals (B) from position sensor 120, pressure transducer 130, and detector 146.

In some embodiments, the control system 114 can include appropriate programming for controlling electrical drive 102 to move piston 106 to rapidly compress (e.g., within 100 ms) the volume of the reaction chamber 110, for example, to perform a rapid compression experiment. In some embodiments, the control system 114 can include further programming for controlling electrical drive 102 to move piston 106 to rapidly expand (e.g., within 100 ms) the volume of the reaction chamber 110, for example, to quench a compression-induced reaction therein. In some embodiments, the control system 114 can include further programming for controlling the valve 134 in an automated fashion to perform an experiment, for example, to switch to supply 136 for loading of reaction chamber 110 when the piston 106 is at an initial position and to switch to vent analyzer 140 after quenching to analyze intermediates produced in the reaction chamber 110. In some embodiments, the control system 114 can include further programming for controlling the light source 144 and/or detector 146 to perform an experiment, for example, to illuminate the contents of the reaction chamber 110 with radiation from source 144 and to detect the resulting light signal (e.g., scattering, reflectance, fluorescence, absorbance, etc.) by detector 146.

A user of the RCM 100 can interact with the control system 114 via user interface 118, for example, to select experimental parameters for compression (e.g., piston velocity, compression ratio, etc.), expansion (e.g., whether quenching is desired, time after EOC to quench, piston velocity, etc.), and/or analysis (e.g., sending products to analyzer 140 or exhaust 138, timing or magnitude of interrogating radiation from source 144, timing of detecting by detector 146, etc.). The user interface 118 can also allow a user to initiate an experiment or to terminate an on-going experiment. In some embodiments, the user interface 118 can also allow a user to view the results of the experiment, for example, via a graphical display or the like.

Other configurations for the RCM are also possible according to one or more contemplated embodiments. For example, in some embodiments, multiple electrical drives operate in parallel to control motion of the piston. Alternatively or additionally, in some embodiments, the RCM may be configured to have an opposing piston configuration, where two pistons are provided at opposite ends of a reaction chamber (e.g., cylinder). In such embodiments, the motion of the pistons toward each other from the opposite ends of the reaction chamber can act to reduce compression times, for example, by reducing a distance each piston has to travel to achieve the desired compression ratio.

Method Embodiments

Figure 2:
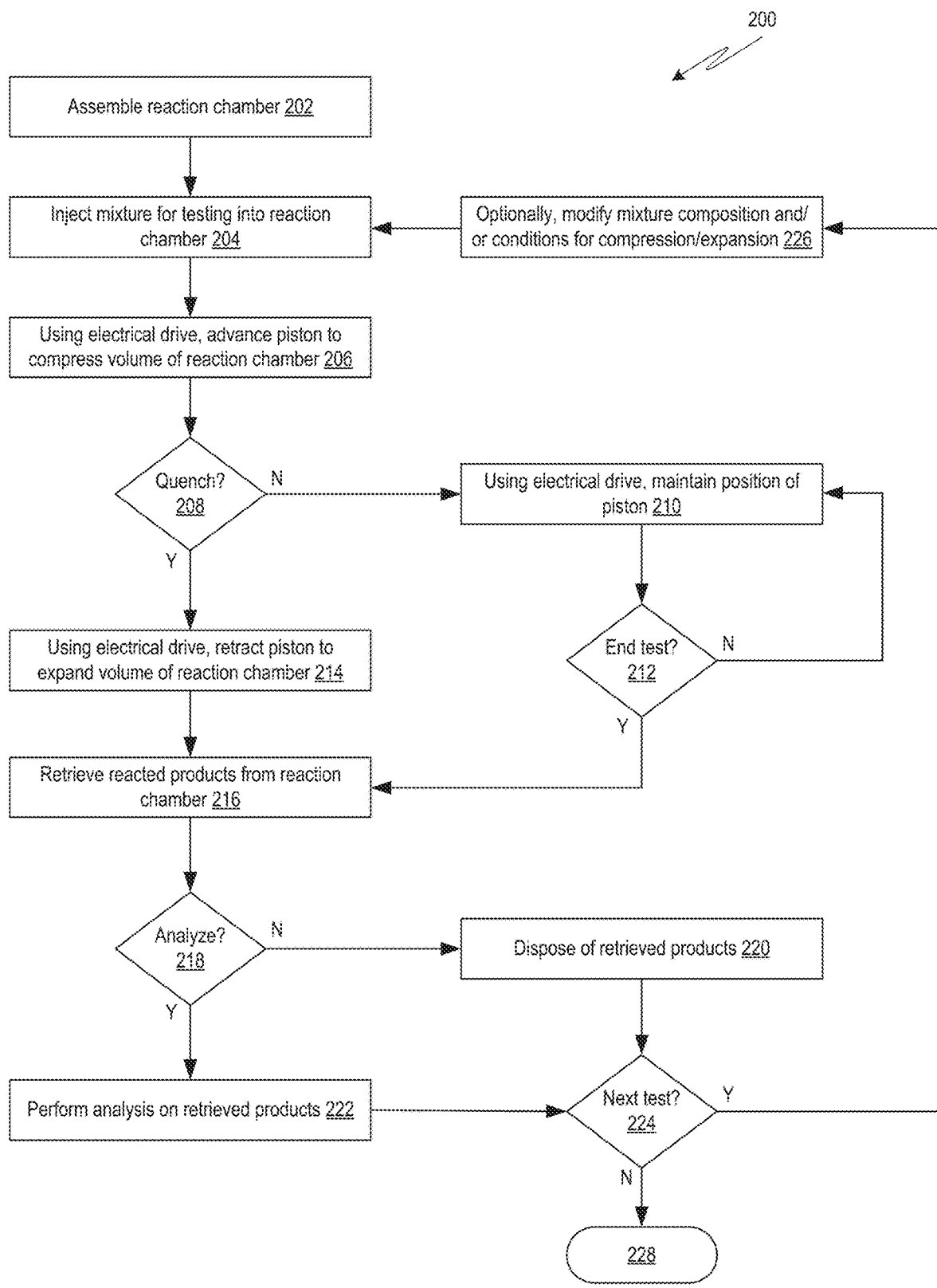
FIG. 2 is a simplified process flow diagram of an exemplary embodiment of a method for using a rapid compression machine to perform one or more analyses, according to one or more embodiments of the disclosed subject matter.

FIG. 2 illustrates an exemplary process 200 for use of an RCM according to one or more embodiments of the disclosed subject matter. The process 200 initiates at process block 202, where the RCM is assembled to enclose the reaction chamber. For example, in FIG. 1, RCM 100 can be assembled by coupling the chamber end plate 112 to the chamber housing 108 and by disposing the piston 106 with thrust rod 104 coupled thereto within the chamber housing 108. This assembly may remain in place between sequential experiments, thereby allowing results from multiple experiments to be obtained without having to disassemble, reconfigure, and/or replace components of the RCM. In some embodiments, process block 202 also includes assembling and mounting the other components of the RCM 100 (e.g., pressure transducer 130, source 144, detector 146) into place.

The process 200 proceeds to process block 204, where an experiment can be initiated by injecting a test mixture (e.g., fuel-air mixture) into the reaction chamber. For example, in FIG. 1, control system 114 can control valve 134 to allow a prepared test mixture to flow from supply 136 into reaction chamber 110 via port 132. The reaction chamber 110 can be vacuumed using an external vacuum pump and the test mixture can then flow from supply 136 into the vacuumed reaction chamber 110 via port 132. The backward facing rear piston seal (e.g., the combination of 424b and 422b in FIG. 4C) can maintain the vacuum within the reaction chamber. In another example, a prepared test mixture can be directly injected (e.g., by manual connection) from a container into the reaction chamber 110 via port 132 without intervening valve 134. In another example, air and fuel may be separately provided to the reaction chamber 110 (e.g., sequentially via port 132 or via separate ports) for mixing therein.

Figure 3A:
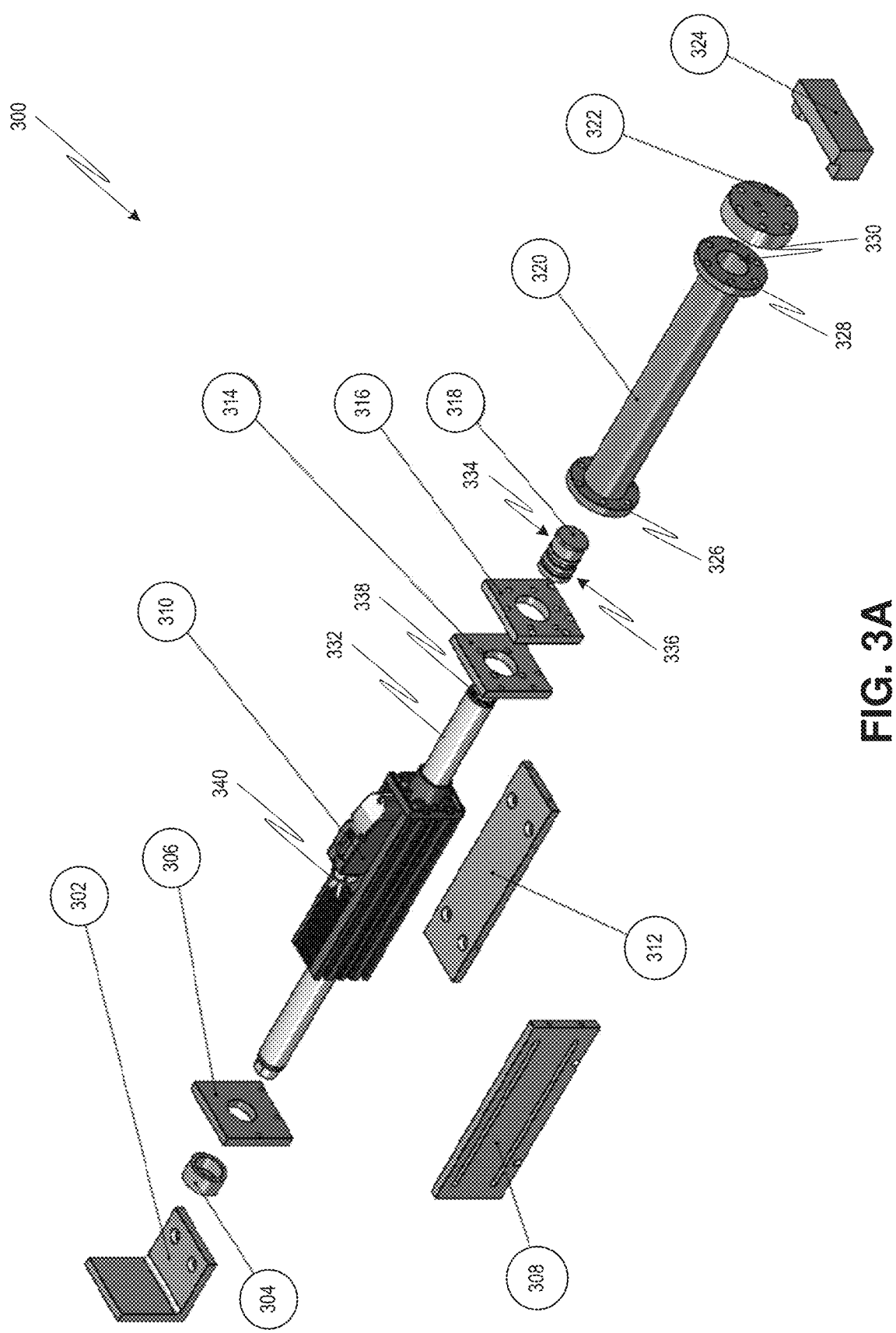
FIG. 3A is an exploded view of components of a fabricated example of a rapid compression machine, according to one or more embodiments of the disclosed subject matter.
Figure 3B:
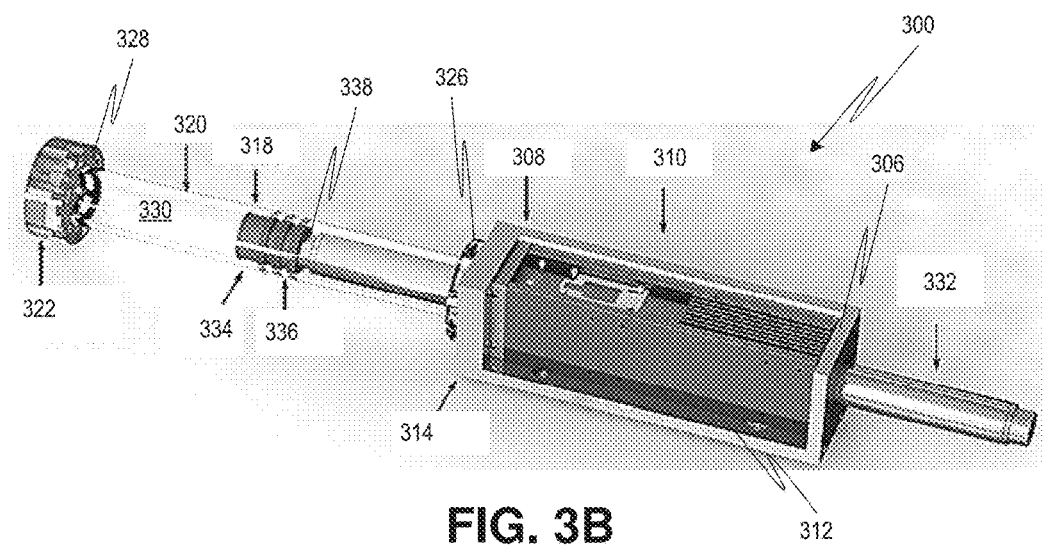
FIG. 3B is an isometric view of partially-assembled components of the rapid compression machine of FIG. 3A.

The process 200 proceeds to process block 206, where the electrical drive is used to advance the piston within the chamber housing toward the chamber end plate so as to rapidly compress a volume of the reaction chamber. For example, in FIG. 1, control system 114 can control electrical drive 102 to move the thrust rod 104 (and thereby the piston 106) toward the chamber end plate 112 with a predetermined motion profile until a predetermined compression ratio (e.g., initial volume of the reaction chamber versus final volume at EOC) is achieved. For example, the predetermined motion profile can include an acceleration value (e.g., for accelerating the piston 106 from initial start to peak velocity), a peak velocity value (e.g., as the piston 106 travels through the chamber housing 108), and/or a deceleration value (e.g., for decelerating the piston 106 from peak velocity to its final position at EOC). The control system 114 can monitor a position of the thrust rod 104 (and thereby the piston 106) as it travels via one or more signals received from position sensor 120 and can control electrical drive 102 responsively thereto to achieve the predetermined motion profile and desired final position of the piston within the chamber housing. In some embodiments, process block 206 can further include, prior to advancing the piston, defining an initial zero position for piston motion. For example, the control system 114 can move thrust rod 104 into contact with a home marker (e.g., interaction between back hard stop 304 and L-shaped hard stop 302 in FIG. 3A) to define the zero position for calibration of position sensor 120.

Once the piston has moved to its desired final position (e.g., corresponding to the predetermined compression ratio), the electrical drive arrests further motion of the piston and a pressure within the reaction chamber can be monitored during the compression-induced reaction, for example, by pressure transducer 130. The process 200 proceeds to decision block 208, where it is determined if quenching is desired. For example, where the RCM is being used to investigate stable intermediaries formed during the induction period, compression-induced reaction within the reaction chamber can be quenched by rapidly retracting the piston within the chamber housing.

If quenching is desired and the quenching criteria has been achieved, the process 200 can proceed to process block 214, where the electrical drive is used to retract the piston within the chamber housing away from the chamber end plate so as to rapidly expand the volume of the reaction chamber. For example, in FIG. 1, control system 114 can control electrical drive 102 to retract the thrust rod 104 (and thereby the piston 106) away from chamber end plate 112 with a predetermined retraction motion profile until a particular position is achieved. For example, the retraction motion profile can include an acceleration value (e.g., for accelerating the piston 106 from EOC position to peak retraction velocity), a peak retraction velocity value (e.g., as the piston 106 travels through the chamber housing 108), and/or a deceleration value (e.g., for decelerating the piston 106 from peak retraction velocity to its final position). As noted above, the control system 114 can monitor a position of the thrust rod 104 (and thereby the piston 106) as it travels via one or more signals received from position sensor 120 and can control electrical drive 102 responsively thereto to achieve the predetermined retraction motion profile and final post-quench position of the piston within the chamber housing.

In some embodiments, the timing of the quenching (e.g., initiation of piston retraction) can be predetermined by a user. The timing of the quenching can be based on an amount of time that has elapsed after EOC (e.g., once the predetermined compression ratio has been reached and the piston motion arrested). The elapsed time after EOC can be set by a user when programming the control system to carry out a desired experiment. Alternatively or additionally, the timing of the quenching can be based on pressure values within the reactor chamber or trajectory of pressure values, as measured by the pressure transducer 130. For example, the quenching may be initiated in response to the pressure value trajectory indicating an induction period (e.g., first stage induction period 2006 or second stage induction period 2010 in FIG. 20A) or an acceleratory phase (e.g., first stage acceleratory phase 2008 or second stage acceleratory phase 2012 in FIG. 20A) preceding autoignition.

If quenching is not desired, the process 200 can proceed from decision block 208 to process block 210, where the electrical drive continues to maintain a position of the piston. For example, the electrical drive can maintain the piston at a substantially constant position within the chamber housing for at least 100 ms (e.g., about 250 ms) despite a pressure within the reaction chamber increasing to greater than 5 bar, for example, about 6.5 bar. The process 200 proceeds to process block 212, where it is determined if the current experiment has reached its end point. For example, the determination of an end of the current experiment may be based on an elapsed time of the experiment (e.g., a time after achieving EOC being equal to or greater than a predetermined time) and/or completion of a compression-induced reaction within the reaction chamber (e.g., autoignition of the test mixture). If it is determined that the current experiment has not reached an end point, the process 200 returns from decision block 212 to process block 210, where the electrical drive continues to maintain a position of the piston.

Otherwise, when it is determined that the current experiment has reached an end point at decision block 212 or after the piston retraction of process block 214, the process 200 can proceed to process block 216, where the reacted products are retrieved from the reaction chamber. For example, in FIG. 1, reacted products can be retrieved from the reaction chamber 110 via port 132 in chamber end plate 112. For example, the control system 114 can control the valve 134 to switch between positions, thereby allowing contents of the reaction chamber 110 to be directed from port 132 to either exhaust 138 or analyzer 140. In some embodiments, the piston can be advanced further into the reaction chamber (e.g., toward chamber end plate 112) to push the contents out of the reaction chamber 110 via port 132.

The process 200 can proceed to decision block 218, where it is determined if the contents from the reaction chamber are to undergo further analysis. If further analysis is desired, the process 200 can proceed to process block 222, where the retrieved products from the reaction chamber undergo further testing, such as by GC, MS, GC-MS, FTIR spectroscopy, and/or NDIR spectroscopy. For example, when the RCM is used to perform an experiment to investigate stable intermediaries formed during the induction period, the further analysis may be used to detect and characterize such stable intermediaries. For example, the control system 114 can control the valve 134 to direct the contents of the reaction chamber 110 to analyzer 140 for further investigation.

If further analysis is not desired, the process 200 can proceed from decision block 218 to process block 220, where the retrieved products from the reaction chamber are discarded. For example, when the RCM is used to perform an experiment to characterize autoignition (e.g., ignition delay measurements), further analyses may not be necessary or desirable. Thus, control system 114 can, for example, open control valve 134 to direct the contents of the reaction chamber 110 to exhaust 138 for disposal.

The process 200 can proceed from either process block 220 or process block 222 to decision block 224, where it is determined if another experiment should be performed using the RCM. If another experiment is not desired, the process 200 can terminate at 228. Otherwise, if another experiment is desired, the process 200 can return to process block 204 where another experiment is initiated by injecting a new test mixture into the reaction chamber. Blocks 204-224 can thus be repeated for the new test mixture. Optionally, prior to repeating process block 204, the test mixture to be injected into the reaction chamber can be modified (e.g., by changing fuel or fuel-air ratios) and/or by altering experiment conditions (e.g., by changing the predetermined compression ratio, compression duration, timing of quenching, etc.). In either case, the RCM can be used to repeat blocks 204-224 without requiring any disassembly and reassembly of the machine, or at least without requiring any disassembly and reassembly of the components forming the reaction chamber. Multiple experiments can thus be performed using the disclosed RCM in less time than that required for similar experiments to be performed using conventional RCMs.

Example 1-Rapid Compression-Expansion Machine (RCEM)

FIGS. 3A-14D illustrates a fabricated RCEM 300 and components thereof that was used to investigate autoignition, ignition delay times, and induction-period stable intermediaries of n-Heptane. RCEM 300 has a linear actuator 310 (sold by Dunkermotoren GmbH, Bonndorf, Germany) that drives a thrust rod 332 (e.g., formed of stainless steel) with enclosed rare earth magnets in a linear fashion. The linear actuator 310 has therein a plurality of motor coils (e.g., stator coils) as well as position sensing electronics (e.g., integrated encoder). An electrical connector 340 on the linear actuator 310 is used to provide electrical power thereto as well as to provide communication between the linear actuator 310 and a control system (e.g., control system 114 in FIG. 1). The thrust rod 332 has a threaded end 338 that screws into a mounting hole 420 (see FIG. 4B) at a rear face 418 of piston 318 (e.g., formed of aluminum). The thrust rod 332 and piston 318 thus move together along a central axis of cylinder 320 (e.g., chamber housing).

Figure 4A:
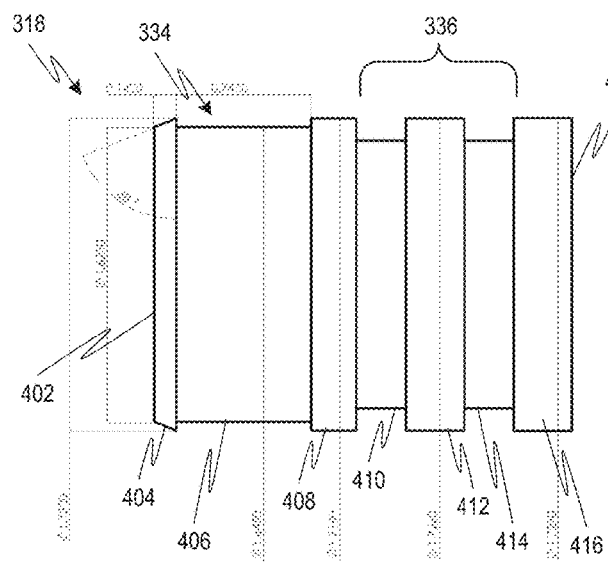
FIGS. 4A-4B are dimensioned side and three-dimensional isometric views of an exemplary piston 318 employed in the rapid compression machine of FIG. 3A.
Figure 4B:
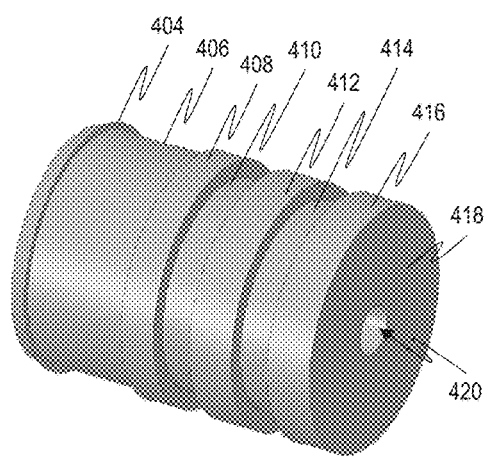
Figure 4C:
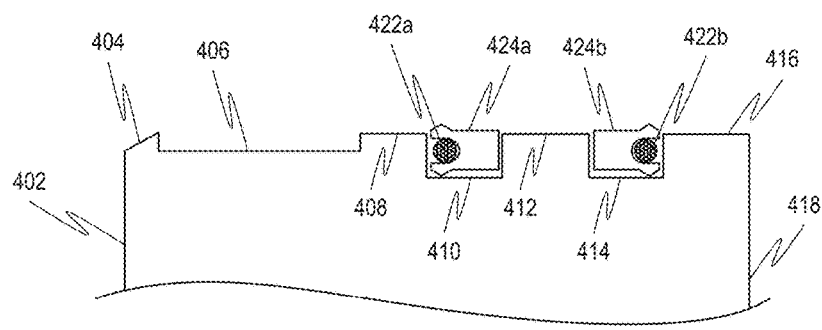
FIG. 4C is a magnified side view showing an exemplary sealing arrangement for the piston of FIGS. 4A-4B.
Figure 5A:
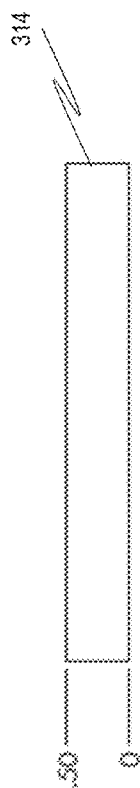
FIGS. 5A-5B are orthogonal, dimensioned side views of an exemplary front plate 314 employed in the rapid compression machine of FIG. 3A.
Figure 5B:
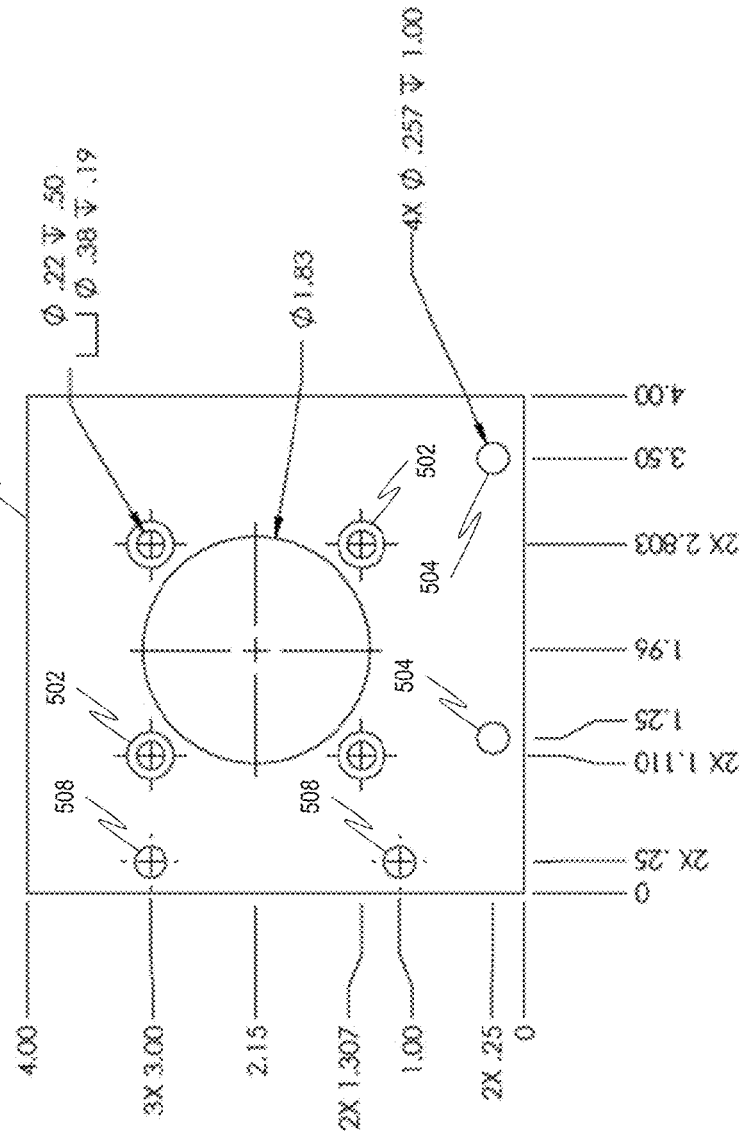
Figure 5C:
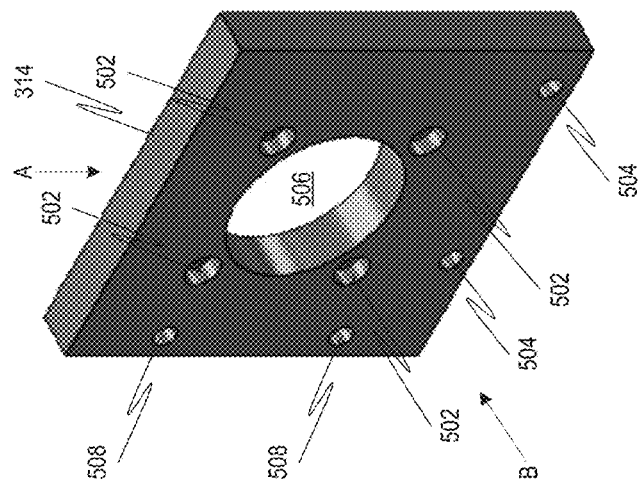
FIG. 5C is a three-dimensional isometric view of the front plate of FIGS. 5A-5B.
Figure 12C:
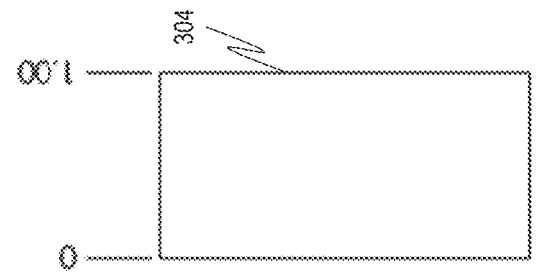
FIGS. 12A-12C are orthogonal, dimensioned side views of an exemplary back hard stop 304 employed in the rapid compression machine of FIG. 3A.
Figure 12D:
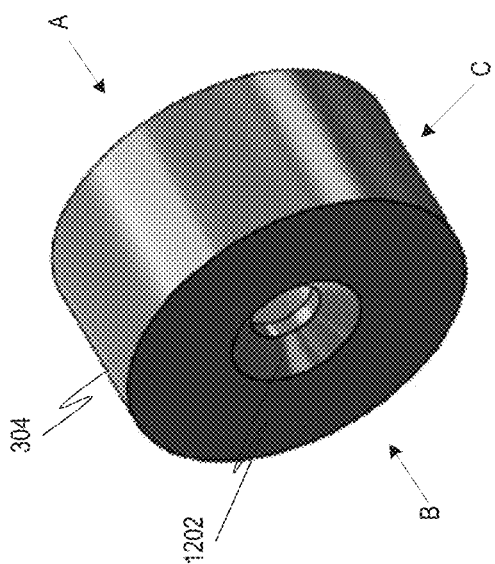
FIG. 12D is a three-dimensional isometric view of the back hard stop of FIGS. 12A-12C.
Figure 12A:
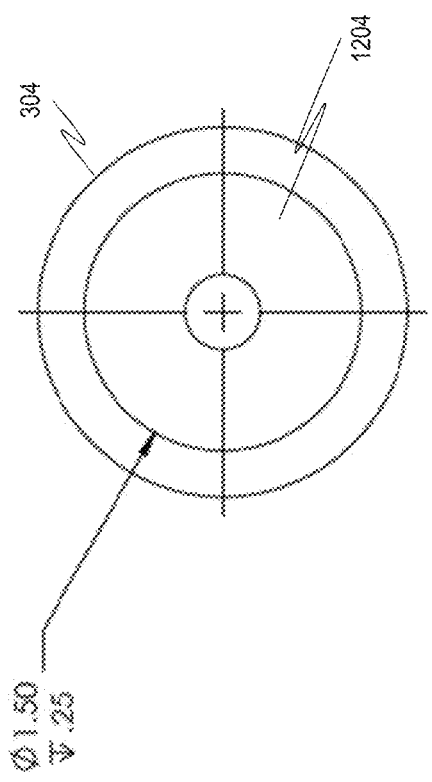
Figure 12B:
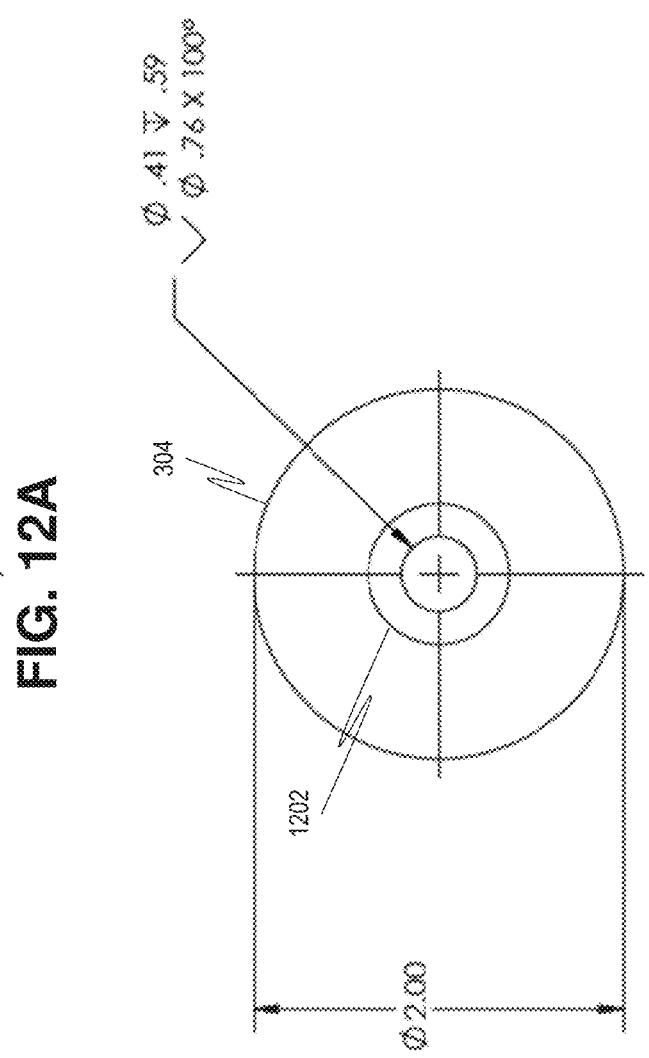

As shown in FIGS. 4A-4C, the piston 318 has a frustoconical portion 404 at a leading end thereof, with a front face 402. Between the frustoconical portion 404 and the seal region 336 is a crevice region 334 formed by a first portion 406 that is substantially cylindrical with a first diameter and an adjacent second portion 408 that is substantially cylindrical with a second diameter greater than the first diameter. The crevice formed between frustoconical portion 404 and second portion 408 can trap any gas rollup vortex due to piston motion and/or reaction of gases within the reaction chamber, thereby leading to more uniform temperature within the reaction chamber. The angle of the frustoconical portion 404 can also allow for optimal gas/fluid motion into the crevice region 334 for trapping therein.

The piston 318 is disposed within interior volume 330 of cylinder 320 (e.g., formed of aluminum), where sealing members in seal region 336 interface with sidewalls of the cylinder 320 to create one or more seals that prevent contents within cylinder 320 from escaping past the piston 318. For example, the seal region 336 includes a pair of circumferential grooves 410, 414, into each of which a respective sealing member is disposed. For example, each sealing member can be formed as an O-ring loaded lip seal, with a U-shaped seal member 424a, 424b and a loading ring 422a, 422b disposed within the U-shaped recess of the respective seal member, as shown in FIG. 4C. In the fabricated RCEM, each seal member was a loaded graphite seal. The O-ring loaded lip seal arranged closer to the rear face 418 of the piston 318 can be disposed in a backward facing orientation (e.g., with the U-shaped recess of seal member 424b opening toward the rear face 418), while the O-ring loaded lip seal arranged closer to the front face 402 of the piston 318 can be disposed in a forward facing orientation (e.g., with U-shaped recess of seal member 424a opening toward the front face 402). In some embodiments, the backward-facing orientation for the U-shaped seal member 424b (and corresponding loading ring 422b) can help prevent influx of ambient air into the reaction chamber when subjecting the reaction chamber to vacuum. Such vacuuming can be used to transfer contents to/from the reaction chamber 110 and/or to completely evacuate the volume of the reaction chamber in preparation for a new experimental run. A first groove 410 is formed between the second portion 408 and a third portion 412 that is substantially cylindrical with a third diameter greater than the second diameter. A second groove 414 is formed between the third portion 412 and a fourth portion 416 that is substantially cylindrical with a fourth diameter greater than the third diameter. The piston 318 has the fourth portion 416 at a back end thereof, with a rear face 418. The increase of diameters for portions 408, 412, and 416 in a direction from the front face 402 toward the rear face 418 can assist in the trapping of the roll-up vortex within the crevice region 334.

Figure 14D:
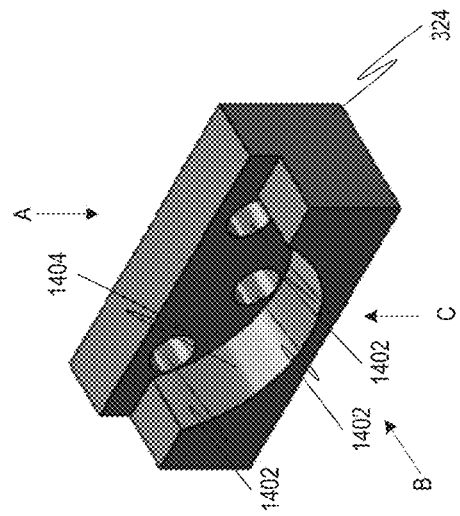
FIG. 14D is a three-dimensional isometric view of the cylinder hard stop of FIGS. 14A-14C.
Figure 14A:
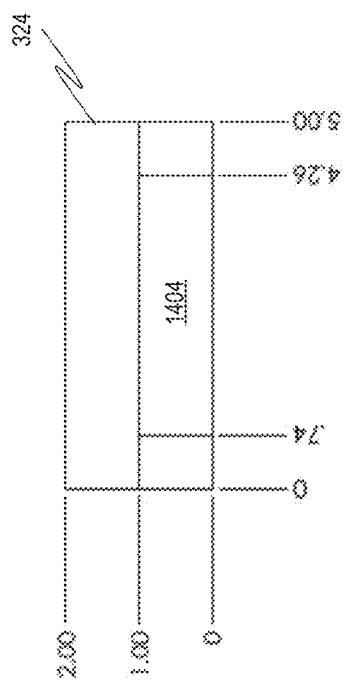
FIGS. 14A-14C are orthogonal, dimensioned side views of an exemplary cylinder hard stop 324 employed in the rapid compression machine of FIG. 3A.
Figure 14B:
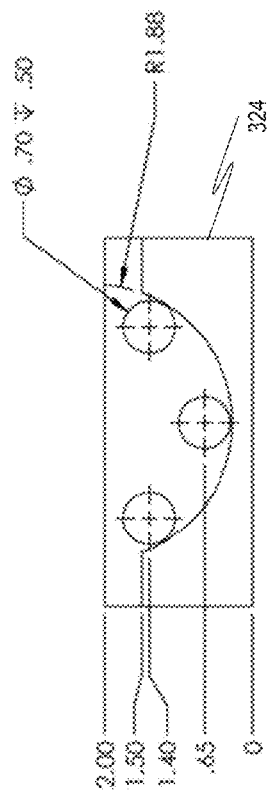
Figure 14C:
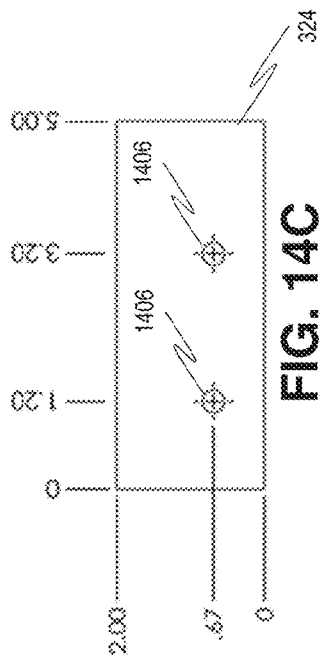

At an end of the cylinder 320 opposite the piston 318, a cylinder head 322 (e.g., chamber end plate) is disposed. The cylinder head 322 (e.g. formed of aluminum) is coupled to cylinder mounting flange 328 and sits within a recess formed by a curved surface 1404 (see FIG. 14D) of cylinder hard stop 324 (e.g. formed of aluminum). As shown in FIG. 14C, the cylinder hard stop 324 includes holes 1406 on a bottom side thereof for coupling the hard stop 324 to an underlying support structure, such as a table or device mount, for example, via respective screws. For example, the cylinder head 322 can be coupled to the mounting flange 328 by bolts that extend through holes 1102 in cylinder head 322 (see FIG. 11C) and through holes 1004 in mounting flange 328 (see FIG. 10C). Hard stop 324 can be provided with recesses 1402 for receiving ends of respective bolts from the cylinder head 322 therein. The reaction chamber is thus formed within the cylinder 320 between the piston 318 and the cylinder head 322. As shown in FIG. 11C, the cylinder head 322 also includes a pair of ports 1104, 1106. A pressure transducer can be mounted in the first port 1104 and can be configured to monitor pressure within the reaction chamber. The second port 1106 can be used as an inlet to the reaction chamber (e.g., for injection of a fuel-air mixture for testing) and as an outlet therefrom (e.g., for removing reaction products from the reaction chamber).

A first front plate 316 (e.g. formed of stainless steel) is disposed at the opposite end of the cylinder 320 and coupled to the mounting flange 326. For example, the first front plate 316 can be coupled to the mounting flange 326 by bolts that extend through holes 602 (see FIGS. 6A, 6C) of the first front plate 316 and through holes 1002 in mounting flange 326 (see FIG. 10C). The first front plate 316 can also include a central opening 606 through which the piston 318 and the thrust rod 332 can pass. A second front plate 314 (e.g., formed of stainless steel) is coupled to a front end of the linear actuator 310. For example, the second front plate 314 can be coupled to the linear actuator 310 via screws that extend through holes 502 (see FIGS. 5B-5C) into respective threaded mounting holes on the linear actuator. The second front plate 314 can also include a central opening 506 through which the piston 318 and the thrust rod 332 can pass. A back plate 306 (e.g. formed of stainless steel) is coupled to a back end of the linear actuator 310. For example, the back plate 306 can be coupled to the linear actuator 310 via screws that extend through holes 902 (see FIGS. 9B-9C) into respective threaded mounting holes on the linear actuator. The back plate 306 can also include a central opening 904 through which the thrust rod 332 can pass.

A bottom plate 312 (e.g., formed of stainless steel) is disposed underneath the linear actuator 310 and is coupled to the underlying support structure, for example, via respective screws or bolts extending through holes 704 (see FIGS. 7C-7D). A side plate 308 (e.g. formed of stainless steel) is coupled to a right side of the linear actuator 310 and to the bottom plate 312. For example, the side plate 308 can be coupled to the bottom plate 312 via screws that extend through holes 804 (see FIGS. 8A-8B) of side plate 308 into threaded mounting holes 702 (see FIG. 7A) of the bottom plate 312. The side plate 308 can be coupled to the linear actuator 310 via screws that extend through slots 802 (see FIGS. 8A-8B) of side plate 308 into threaded nuts retained within respective slots on a side of the linear actuator 310. The slotted coupling allows the screws to be placed at any location along the length of each slot 802.

The first front plate 316 can be coupled to the second front plate 314, the side plate 308, and the bottom plate 312. For example, screws can extend through holes 604 (see FIGS. 6A and 6C) of the first front plate 316 and corresponding holes 504 (see FIGS. 5B-5C) of the second front plate 314 into threaded holes 706 (see FIG. 7B) of the bottom plate 312, and screws can extend through holes 608 of the first front plate 316 and corresponding holes 508 of the second front plate 314 into threaded holes 806 (see FIGS. 8A and 8C) of the side plate 308. Thus, the linear actuator 310 is coupled to the underlying support structure via the couplings of the second front plate 314 and the side plate 308 to the side plate 308 and bottom plate 312, and the cylinder 320 is coupled to the underlying support structure via the couplings of the first front plate 316 to the side plate 308 and bottom plate 312 and the coupling to the hard stop 324.

An L-shaped hard stop 302 (e.g., formed of carbon steel) is provided at an end of the RCEM 300 opposite from hard stop 324. The L-shaped hard stop 302 has a substantially horizontal flange 1304 and a substantial vertical flange 1302 that is arranged substantially perpendicular to a direction of travel of thrust rod 332. The L-shaped hard stop 302 can be coupled to the underlying support structure, for example, via respective screws or bolts that extend through holes 1306 in horizontal flange 1304. The L-shaped hard stop 302 can serve as a safety to prevent excessive retraction of thrust rod 332.

The RCEM 300 is also provided with a back hard stop 304 (e.g., formed of aluminum) between a back end of the linear actuator 310 and the L-shaped hard stop 302. The back hard stop 304 has a recess 1204 facing a rear end of thrust rod 332. The back hard stop 304 (mounted on the thrust rod) in conjunction with the L-shaped hard stop 302 can be used to define a home position for encoder reference. For example, the linear actuator 310 can slowly retract the thrust rod 332 until the rear end of the back hard stop 304 comes into contact with the L-shaped back hard stop 302. The encoder of the linear actuator 310 can associate this position as an initial "zero" starting point for the thrust rod 332 and thus the piston 318. Subsequent motion of the thrust rod 332 and piston 318 can thus be tracked by the encoder with respect to this initial zero position.

In the fabricated RCEM, the linear actuator 310 was able to provide velocities of more than 5 m/s, accelerations/decelerations of 150 m/s$^2$, and a continuous driving force. The fabricated RCEM 300 was able to continuously sustain compressed pressures of up to 5 bar and post ignition pressures of close to 20 bar. The operating pressure can be increased by providing multiple linear actuators 310 operating in tandem. The linear actuator 310 operates under the Controller Area Network Open (CANopen) communication protocol. In some embodiments, the communication protocol can be adapted to allow multiple linear actuators to operate in parallel, for example, to increase the force capability (and thereby the resulting maximum pressure that can be accommodated within the reaction chamber). In some embodiments, the communication protocol can also be adapted to synchronize operation of diagnostic tools (e.g., laser, camera, etc.) to the operation of the RCEM.

Although specific materials and dimensions have been discussed above and illustrated in the figures for the fabricated RCEM, such materials and dimensions are to be understood as exemplary only. Indeed, other materials and dimensions are also possible according to one or more contemplated embodiments. Moreover, although some components of the fabricated RCEM have been illustrated in the figures and described above as separate components, embodiments of the disclosed subject matter are not limited thereto. Rather, in some embodiments, certain components can be combined together into a single monolithic component (e.g., formed as an integral component without being assembled from various subcomponents). For example, in some embodiments, the first front plate 316 and the second front plate 314 can be combined together as a single front plate. Furthermore, embodiments of the disclosed subject matter can include additional components beyond those specifically illustrated in the figures and described above for the fabricated RCEM. For example, in some embodiments, an RCEM can include a pair of side plates (rather than just side plate 308) and/or a top plate (rather than just bottom plate 312).

Example 2A—Autoignition of n-Heptane

Using a fabricated RCEM, the autoignition of n-Heptane was studied. A premixed test charge was prepared in a 12.41 L stainless steel vessel equipped with magnetic stirrers. The oxidizer was comprised of ultra-high purity argon and oxygen in a molar ratio of 1:3.76. The composition of the oxidizer was determined based on the fill pressure for each individual component, and an appropriate amount of liquid fuel (n-Heptane≥99%) was weighed and injected into the mixing tank. This mixture was then introduced into the RCEM for the tests. The piston rapidly compresses the fixed mass of gas from an initial state ($T_0$, $P_0$) to a final compressed state ($P_c$, $T_C$). A data acquisition device (NI PCIe-6351, X Series DAQ with 16 analog inputs, 24 digital inputs/outputs, and 2 analog outputs; sold by National Instruments, Austin, TX) was used to acquire pressure and encoder pulse data shown in FIGS. 15A and 15B.

Figure 15A:
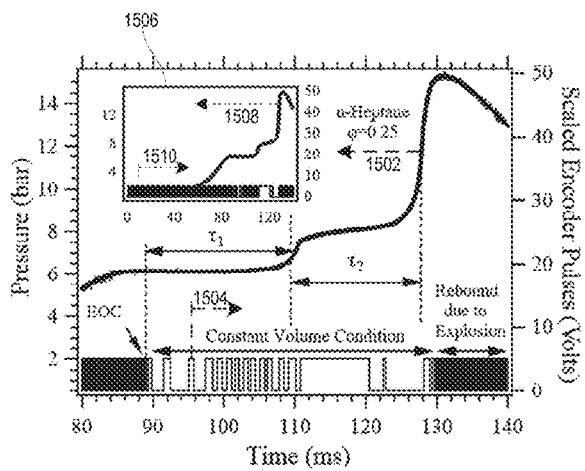
FIG. 15A provides graphs of measured pressure (bar) and encoder signals (volts) versus time (ms) during a reactive run of an embodiment of a disclosed fabricated rapid compression machine using a mixture of n-Heptane and gaseous oxidizer. Inset 1506 shows pressure 1508 and encoder signal 1510 curves for the entire reactive run, while the main graph is a magnified portion of the inset 1506 and shows pressure 1502 and encoder signal 1504 curves during a time period after the end of compression.
Figure 15B:
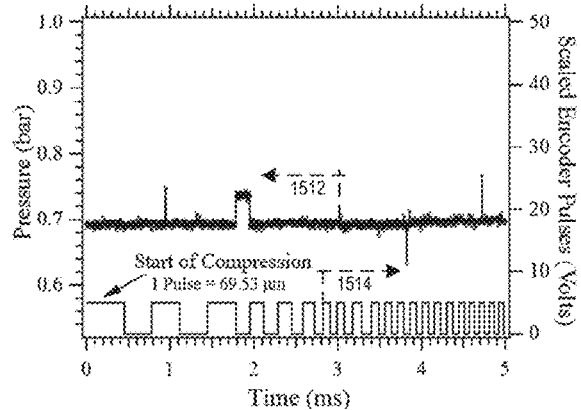
FIG. 15B is a magnified portion of the inset 1506 of FIG. 15A and shows pressure 1512 and encoder signal 1514 curves at the start of compression.

As discussed above, the fabricated RCEM can operate with just rapid compression (e.g., similar to a traditional RCM, but with improved performance) or with both rapid compression and expansion. In either operation mode, the fabricated RCEM can provide a clear identification of the start of compression (SOC) and the end of compression (EOC) based on the built-in feedback from the encoder. Each encoder pulse corresponds to a displacement of 69.53 µm. As shown by pulse train 1514 in FIG. 15B, the SOC can be easily identified. The EOC can also be easily identified, as reflected by pulse train 1504 in FIG. 15A. FIG. 15A also demonstrates that the fabricated RCEM is capable of maintaining truly constant volume conditions (pulse train 1504) after EOC and up until the onset of hot ignition of the n-Heptane.

Figure 16A:
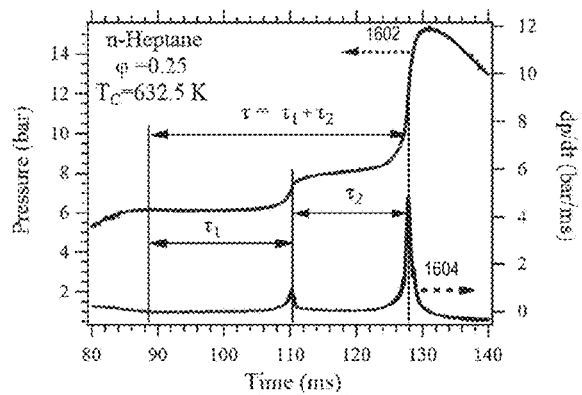
FIG. 16A is a graph of measured pressure 1602 (bar) and rate of pressure change (dp/dt) (bar/ms) 1604 signals versus time (ms) during a time period after the end of compression by an embodiment of a disclosed fabricated rapid compression machine using a mixture of n-Heptane and gaseous oxidizer.

The dynamic pressure within the reaction chamber of the RCEM during and after the compression was measured using a piezoelectric pressure transducer (M5 Miniature PiezoStar® Cylinder Pressure Sensor for Combustion Engines, Type 6052C, sold by Kistler Instrument Corp., Novi, MI) and a charge amplifier (Charge Amplifier Type 5011B, sold by Kistler Instrument Corp., Novi, MI). The initial feed pressure ($P_0$) was determined by a separate absolute pressure sensor. Dynamic pressure data during compression was acquired by a high-speed data acquisition system at a rate of 300 samples per millisecond. The definition of the ignition delay time was based on the maximum rate of pressure rise $(dp/dt)_{max}$ during both the first and second stage ignition delay after EOC, as shown in FIG. 16A. The overall delay ($\tau$) was determined as the sum of the first ($\tau_1$) and second stage ($\tau_2$) delays.

Figure 16B:
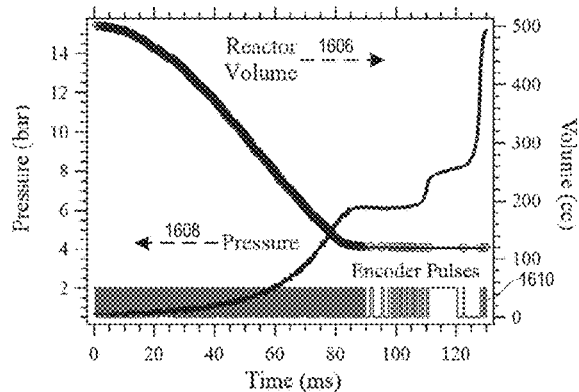
FIG. 16B is a graph of measured pressure 1608 (bar) and reactor volume 1606 (cc) versus time (ms) during the reactive run of an embodiment of a disclosed fabricated rapid compression machine using a mixture of n-Heptane and gaseous oxidizer.

The position feedback in the fabricated RCEM allowed for the reconstruction of the piston trajectory (and thus the volume of the reaction chamber) as a function of time, which was useful in simulating the system using detailed chemistry. In particular, an input parameter for the simulations was the volume of the reaction chamber as a function of time. An example of the reconstruction of the reaction chamber volume 1606 from piston displacement (based on encoder output 1610) is shown in FIG. 16B. The corresponding reactive pressure trace 1608 is also shown in FIG. 16B.

Example 2B—Ignition Delay Times

Figure 17A:
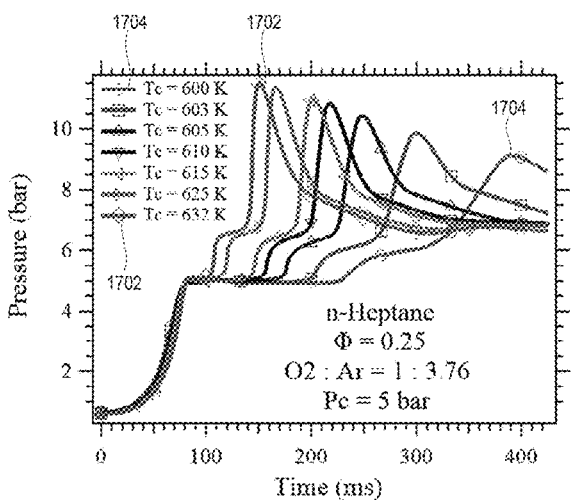
FIG. 17A is a graph of measured pressure (bar) versus time (ms) to auto-ignition for n-Heptane in an embodiment of a disclosed fabricated rapid compression machine at different compression temperatures (K).
Figure 17B:
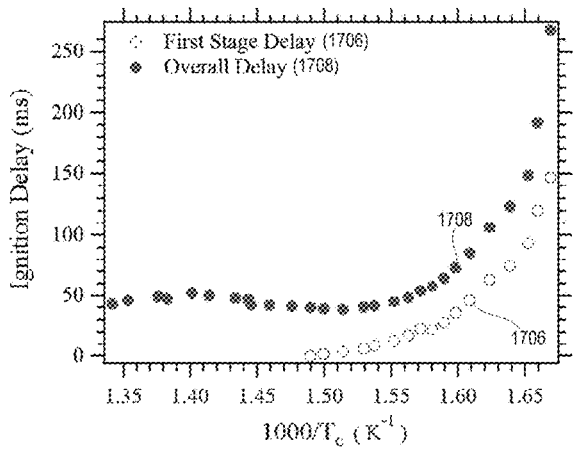
FIG. 17B is a graph of auto-ignition time delay (ms), including first stage delay 1706 and overall delay 1708, versus compression temperature (K) for n-Heptane derived from the data of FIG. 17A.

Using the fabricated RCEM, results were obtained for autoignition of n-Heptane at a compressed charge pressure ($P_C$) of 5 bar and for compressed temperatures ($T_C$) in a range of 600-750 K. Selected pressure traces for an equivalence ratio of $\phi=0.25$ are shown in FIG. 17A, with the pressure trace corresponding to $T_C=600$ labeled as 1704 and the pressure trace corresponding to $T_C=632K$ labeled as 1702. As shown in FIG. 17A, there is a clear two-stage ignition trend in the pressure-time records. FIG. 17B shows the first-stage delay 1706 and the overall ignition delay 1708 inferred from the pressure traces of FIG. 17A as a function of temperature. The overall ignition delay 1708 was seen to exhibit a negative temperature coefficient behavior while the first stage delay 1706 decreases monotonically with increasing temperature. FIGS. 17A-17B also show that the fabricated RCEM provided relatively-long ignition delay times of up to a quarter-second (250 ms). Such long delay times have previously been unattainable with conventional RCMs. Without being bound by any particular theory, it is believed that the minimal post-compression heat loss offered by the fabricated RCEM enabled such long test times.

Figure 18A:
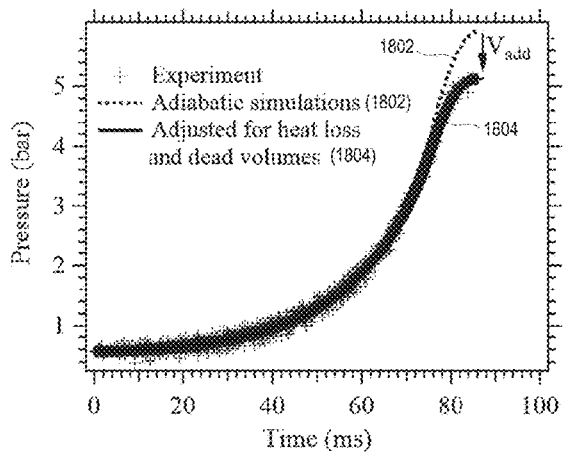
FIG. 18A is a graph comparing experimentally-measured pressure data (bar) to simulated pressure data 1802, 1804 versus time (ms) for n-Heptane in an embodiment of a disclosed fabricated rapid compression machine.

As shown in FIG. 18A, the experimentally-observed pressure values at EOC were slightly lower than simulations 1802 based on adiabatic conditions and the true geometric volume of the reaction chamber. The difference in the experimental values may be due to the heat loss from the compressed gases to the walls of the reaction chamber as well as the presence of small dead volumes from the inlet to the reaction chamber and/or the pressure transducer. The experimental and simulated EOC pressure values were matched by assigning an adjustable extra volume ($V_{add}$) in addition to the true geometric volume ($V_g$) during the simulations. In FIG. 18A, trace 1804 represents the simulated EOC pressure values with appropriate volume adjustment. In particular, the adiabatic simulation values 1802 in FIG. 18A were based on the true geometrical volume, $V_g$, of the reaction chamber (which was 487 cm$^3$), while the adiabatic simulation values 1804 were based on the true geometrical volume of the reaction chamber plus an additional dead volume, $V_{add}$, of 14.25 cm$^3$. The resulting temperature values at EOC with this adjusted volume were subsequently denoted as $T_C$.

Figure 18B:
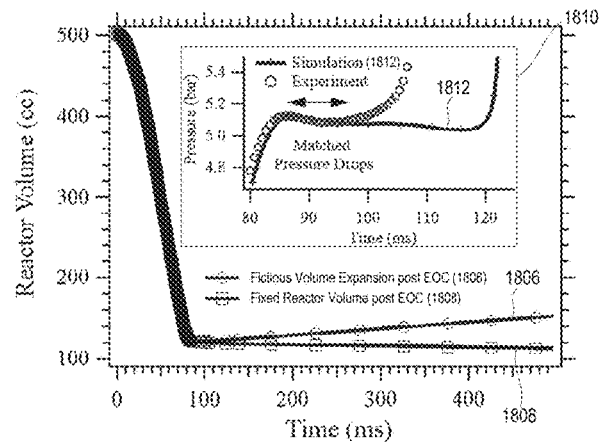
FIG. 18B shows a graph comparing simulated reactor volumes 1806, 1808 (cc) versus time (ms) for n-Heptane in an embodiment of a disclosed fabricated rapid compression machine and a graph (inset 1810) comparing experimentally-measured pressure data (bar) to simulated pressure data 1812 versus time (ms) for n-Heptane in an embodiment of a disclosed fabricated rapid compression machine after the end of compression.

The post-compression pressure drops observed in the experiments were modeled by incorporating a fictitious time-varying volume expansion for the reaction chamber after the EOC. For example, FIG. 18B shows a curve for reactor volume when the volume remains fixed after EOC (1808) and a curve for reactor volume when the fictitious time-varying expansion has been added (1806). In the simulations, the volume expansion for curve 1806 was chosen such that the post-EOC pressure traces for both the experiment and simulation 1812 show matched pressure drop rates, as illustrated by the inset of FIG. 18B.

Figure 19:
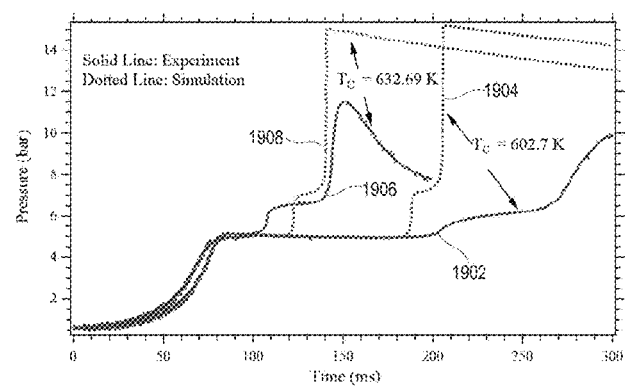
FIG. 19 is a graph comparing experimentally-measured pressure data 1902, 1906 (bar) to simulated pressure data 1904, 1908 versus time (ms) for n-Heptane in an embodiment of a disclosed fabricated rapid compression machine at various compression temperatures.

Numerical simulations were carried out using the Ansys Chemkin-Pro Package (sold by Ansys, Inc., Canonsburg, PA). The zero-dimensional closed homogeneous reactor model was used with detailed chemistry. The chemical kinetic mechanism for n-Heptane from the Lawrence Livermore National Laboratory (LLNL) (n-Heptane, Detailed Mechanism, Version 3.1) was used in the simulation for the chemistry set. FIG. 19 shows experimentally-obtained data traces for $T_C=602.7$ K (1902) and for $T_C=632.69$ K (1906), and respective simulation data traces 1904, 1908. The simulation results 1904, 1908 exhibited a shorter overall delay compared to the experiments 1902, 1906, but the agreement seemed to improve with increased compressed temperature ($T_C$). Note that this temperature value ($T_c$) was obtained from computations at the time instant corresponding to the EOC, with the time for the EOC depending on the stroke length such that the longer stroke (higher $T_c$) takes more time.

Example 2C—Speciation

In addition to the ignition delay measurements, the stable intermediaries formed during the induction period were also investigated using the fabricated RCEM. In some cases, the speciation data can be used to validate low-temperature sub-models for kinetic schemes. The speciation experiments were carried out by operating the RCEM to rapidly retract the piston at a time point between EOC and autoignition, thereby expanding the reaction chamber. The time delay between EOC compression and the piston retraction can be varied in a controlled fashion, with the rapid volume expansion leading to quenching of reactions of the fuel-air mixture in the reaction chamber. The reaction products can thus be analyzed at various times during the induction period.

Figure 20A:
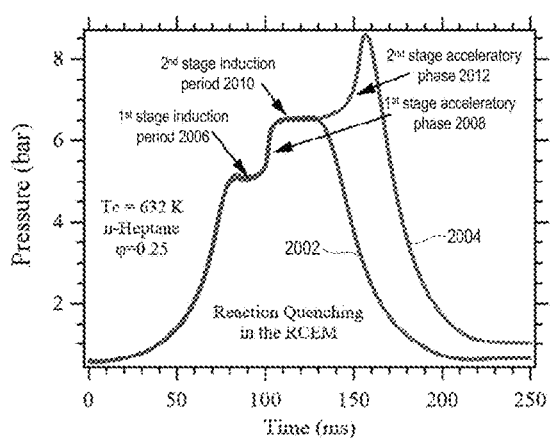
FIG. 20A is a graph of measured pressure (bar) versus time (ms) during a reactive run of an embodiment of a disclosed fabricated rapid compression machine operating to quench the reaction prior to auto-ignition of n-Heptane.

An example of the quenching of the reaction during the second-stage induction period and the following acceleratory phase is shown in FIG. 20A. As illustrated, the quench provided by the RCEM is very rapid, and the process is very repeatable as seen from the overlap in FIG. 20A between the first stage induction period 2006 and first stage acceleratory phase 2008 of pressure trace 2002 (for an n-Heptane reaction quenched during second stage induction 2010) and pressure trace 2004 (for a subsequent n-Heptane reaction quenched after the second stage induction 2010). As noted above, the tracking of the intermediates during the pre-ignition phase as a function of time has heretofore been a very challenging task due to the rapidity and explosive nature of the reaction. Indeed, many previous studies that tracked product evolution as a function of time were limited to sub-atmospheric conditions in closed vessels. In contrast, the fabricated RCEM is capable of providing reliable, repeatable data regarding reactivity build up during the ignition chain reaction sequence with relative ease.

Figure 20B:
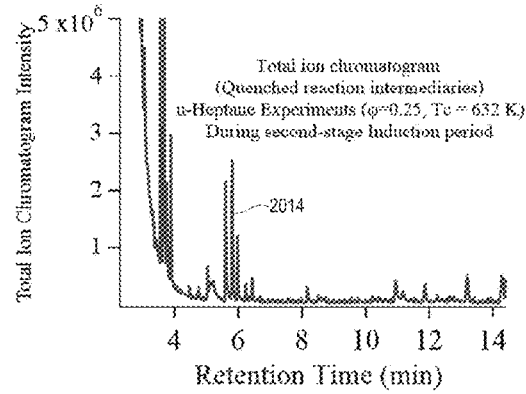
FIG. 20B is a chromatogram of stable intermediates obtained from an embodiment of a disclosed fabricated rapid compression machine after quenching.
Figure 21A:
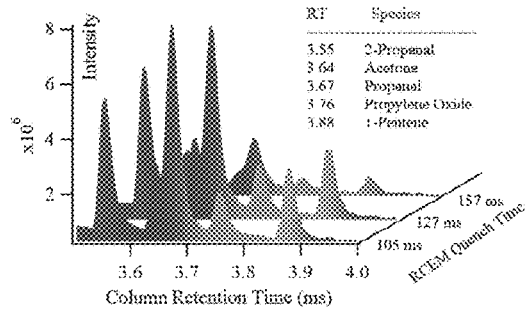
FIGS. 21A-21B are chromatograms for detected species that evolved from n-Heptane during second-stage ignition in an embodiment of a disclosed fabricated rapid compression machine at various quench times and for gas chromatograph retention times of 3.5-4.0 minutes and 5.5-6.5 minutes, respectively.
Figure 21B:
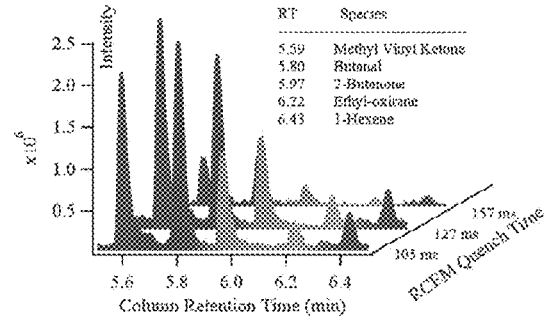

To analyze the intermediate species resulting from the quenched reaction in the fabricated RCEM, a gas-chromatography mass spectrometry (GC/MS) system was used. Gas chromatography was provided by a Trace GC Ultra Gas Chromatograph (sold by Thermo Fisher Scientific, Waltham, MA), while mass spectrometry was provided by a Trace Dual-Stage Quadrupole Mass Spectrometer (sold by Thermo Fisher Scientific, Waltham, MA). The quenched sample was collected from the reaction chamber of the RCEM after each test and analyzed by the GC/MS system. A 50 m fused silica capillary column (Rtx-DHA-50 column, sold by Restek Corporation, Bellefonte, PA) was used for GC separation of the compounds. The GC separation was carried out at 30° C. The National Institute of Standards and Technology (NIST) spectral database was used to qualitatively identify the compounds present in the quenched gases. Under the conditions reflected in FIG. 20A, at least 23 intermediate species were detected, as shown in the chromatogram 2014 of FIG. 20B. The time evolution of a few selected species is shown in FIGS. 21A-21B. The plots show the stable intermediate species evolution trend as the ignition process proceeds through the second stage induction 2010 and ignition steps. The stable species formed during the induction period include alkenes, aldehydes, ketones, and oxiranes, with specific compounds identified and listed in FIGS. 21A-21B.

Computer Implementation

Figure 22:
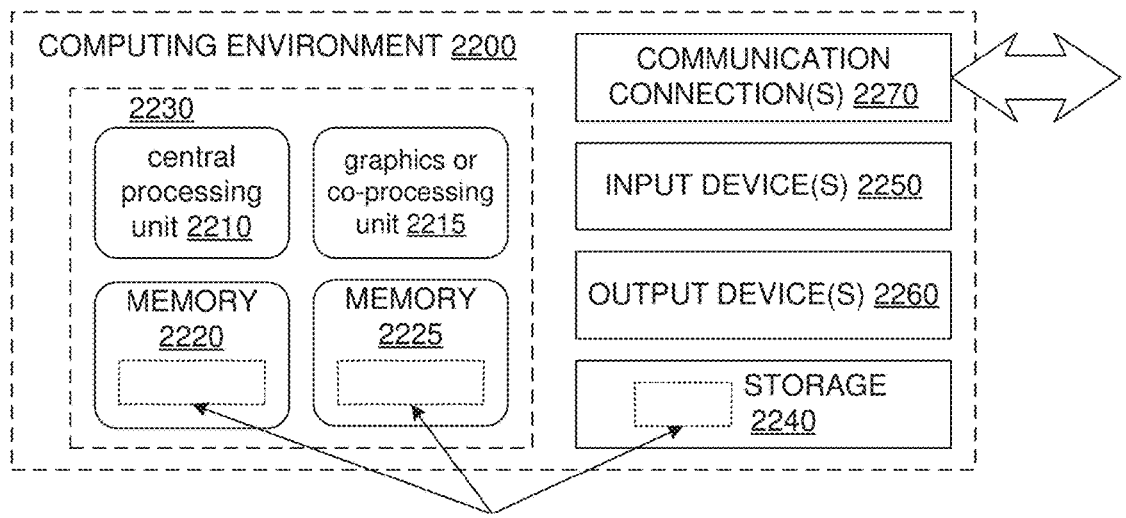
FIG. 22 depicts a generalized example of a suitable computing environment in which the described innovations may be implemented.

FIG. 22 depicts a generalized example of a suitable computing environment 2200 in which the described innovations may be implemented. The computing environment 2200 is not intended to suggest any limitation as to scope of use or functionality, as the innovations may be implemented in diverse general-purpose or special-purpose computing systems. For example, the computing environment 2200 is any of a variety of computing devices (e.g., desktop computer, laptop computer, server computer, tablet computer, etc.).

The computing environment 2200 includes one or more processing units 2210, 2215 and memory 2220, 2225. In FIG. 22, this basic configuration 2230 is included within a dashed line. The processing units 2210, 2215 execute computer-executable instructions. Each processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 22 shows a central processing unit 2210 as well as a graphics processing unit or co-processing unit 2215. The tangible memory 2220, 2225 may be volatile memory (e.g., registers, cache, RAM), non-volatile memory (e.g., ROM, EEPROM, flash memory, etc.), or some combination of the two, accessible by the processing unit(s). The memory 2220, 2225 stores software 2280 implementing one or more innovations described herein, in the form of computer-executable instructions suitable for execution by the processing unit(s).

A computing system may have additional features. For example, the computing environment 2200 includes storage 2240, one or more input devices 2250, one or more output devices 2260, and one or more communication connections 2270. An interconnection mechanism (not shown) such as a bus, controller, or network interconnects the components of the computing environment 2200. Typically, operating system software (not shown) provides an operating environment for other software executing in the computing environment 2200, and coordinates activities of the components of the computing environment 2200.

The tangible storage 2240 may be removable or non-removable, and includes magnetic disks, magnetic tapes or cassettes, CD-ROMs, DVDs, or any other medium which can be used to store information in a non-transitory way, and which can be accessed within the computing environment 2200. The storage 2240 stores instructions for the software 2280 implementing one or more innovations described herein.

The input device(s) 2250 may be a touch input device such as a keyboard, mouse, pen, or trackball, a voice input device, a scanning device, or another device that provides input to the computing environment 2200. The output device(s) 2260 may be a display, printer, speaker, CD-writer, or another device that provides output from computing environment 2200.

The communication connection(s) 2270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). As used herein, the term computer-readable storage media does not include communication connections, such as signals, carrier waves, or other transitory signals. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, structures, and systems are not limited to any specific aspect or feature or combination thereof, nor do the disclosed embodiments require that any one or more specific advantages be present, or problems be solved. The technologies from any example can be combined with the technologies described in any one or more of the other examples. In view of the many possible embodiments to which the principles of the disclosed technology may be applied, it should be recognized that the illustrated embodiments are only illustrative examples and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

Directions and other relative references may be used to facilitate discussion of the drawings and principles herein, but are not intended to be limiting. For example, certain terms may be used such as "inside," "outside.", "top." "bottom," "interior," "exterior," "left," right." "front." "back." "rear." and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as our invention all that comes within the scope and spirit of these claims.

I claim:

1. A system, comprising:
    a chamber housing having a viewing portion or window that is substantially transparent to optical radiation;
    a piston disposed within the chamber housing;
    an electrical drive coupled to the piston and constructed to convert electrical power into linear motion of the piston within the chamber housing,
    wherein the chamber housing and the piston together define a reaction chamber, and
    wherein linear motion of the piston within the chamber housing changes a volume of the reaction chamber;

at least one of a light source and a light detector; and a control system comprising a first signal output coupled to the electrical drive and a second signal output coupled to the at least one of the light source and the light detector, wherein the control system is configured to synchronize operation of the at least one of the light source and the light detector with operation of the electrical drive, wherein the control system is configured to determine whether a quenching criteria is met, and based on a determination that the quenching criteria is met, provide a signal via the first signal output to the electrical drive to provide reverse motion of the piston.

2. The system of claim 1, wherein the piston has one or more seals constructed to interface with surrounding surfaces of the chamber housing to seal the reaction chamber from an environment external to the chamber housing.

3. The system of claim 2, wherein the piston comprises a sealing portion upon which the one or more seals are disposed, a frustoconical portion that faces the reaction chamber, and a circumferential groove disposed between the sealing portion and the frustoconical portion.

4. The system of claim 3, wherein each seal comprises a loaded seal.

5. The system of claim 1, wherein the control system comprises:
   one or more processors;
   an input/output interface situated to control the electrical drive; and
   computer-readable storage media storing computer-executable instructions that, when executed by the one or more processors, cause the one or more processors to collectively control the electrical drive to move the piston within the chamber housing or to maintain a position of the piston within the chamber housing.

6. The system of claim 1, wherein the electrical drive comprises a linear actuator with a thrust rod coupled to an end of the piston.

7. The system of claim 1, further comprising a position sensor that monitors a position of the piston or a member that couples the piston to the electrical drive.

8. The system of claim 1, wherein the electrical drive comprises an internal position sensor that monitors a position of a member that couples the piston to the electrical drive.

9. The system of claim 1, wherein the electrical drive is constructed to maintain a position of the piston within the chamber housing despite a pressure greater than 5 bar being generated within the reaction chamber.

10. The system of claim 1, wherein the chamber housing has a first port for introducing a test mixture to the reaction chamber and/or for withdrawing reacted products from the reaction chamber.

11. The system of claim 1, further comprising a pressure transducer mounted in or on the chamber housing and constructed to measure pressure within the reaction chamber.

12. The system of claim 1, wherein:
   the chamber housing comprises an end plate at an opposite end of the reaction chamber from the piston, and
   a first port is formed in the end plate, a pressure transducer is mounted in or to the end plate, the viewing portion or window is formed in the end plate, the viewing portion or window is formed between the end plate and other portions of the chamber housing, or any combination thereof.

13. A method, comprising:
   advancing a piston into a chamber housing using an electrical drive, the chamber housing and the piston together defining a reaction chamber, the advancing reducing a volume of the reaction chamber, thereby increasing pressure and temperature in the reaction chamber;
   synchronously operating at least one of a light source and a light detector with the operation of the electrical drive;
   after the advancing, using the electrical drive to maintain a position of the piston within the chamber housing,
   wherein the position of the piston is substantially maintained at least until components within the reaction chamber undergo auto-ignition;
   determining whether a quenching criteria is met; and
   based on a determination that the quenching criteria is met, reversing the piston using the electrical drive.

14. The method of claim 13, wherein during at least part of the using the electrical drive to maintain the position of the piston, the pressure within the reaction chamber is at least 5 bar.

15. The system of claim 1, wherein the quenching criteria is based on any combination of a timing value and a pressure value.

* * * * *